(12) United States Patent
Ponomarenko et al.

(10) Patent No.: US 12,243,130 B2
(45) Date of Patent: *Mar. 4, 2025

(54) DATA INTERPOLATION PLATFORM FOR GENERATING PREDICTIVE AND INTERPOLATED PRICING DATA

(71) Applicant: Caplight Technologies, Inc., San Francisco, CA (US)

(72) Inventors: Olga Ponomarenko, San Francisco, CA (US); Javier Avalos, San Francisco, CA (US); Justin Moore, San Francisco, CA (US); Marc Perkins, San Francisco, CA (US)

(73) Assignee: Caplight Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,361

(22) Filed: Aug. 15, 2024

(65) Prior Publication Data

US 2024/0404137 A1  Dec. 5, 2024

Related U.S. Application Data

(63) Continuation of application No. 18/597,110, filed on Mar. 6, 2024.
(Continued)

(51) Int. Cl.
*G06T 11/20* (2006.01)

(52) U.S. Cl.
CPC .................. *G06T 11/206* (2013.01)

(58) Field of Classification Search
None
See application file for complete search history.

(56) References Cited

U.S. PATENT DOCUMENTS

| 11,893,640 | B2* | 2/2024 | Mond | G06Q 20/10 |
| 2019/0370902 | A1* | 12/2019 | Yiin | G06F 18/2148 |

(Continued)

OTHER PUBLICATIONS

Price Waterhouse Cooper (PWC), "Successful Investing: The Difference between Price and Value", 2013, PWC, retrieved from "https://www.pwc.com/gx/en/deals/swf/publications/assets/successful-investing-the-difference-between-price-and-value.pdf" (Year: 2013).*

(Continued)

*Primary Examiner* — Michael J Cobb
(74) *Attorney, Agent, or Firm* — Ice Miller LLP

(57) ABSTRACT

A system may comprise a data interpolation platform that comprises a data collector, a pre-processor, an artificial intelligence (AI) engine, an interactive graphical user interface (GUI) engine, a data monitor and one or more servers. The data collector may be configured to collect, from among one or more data sources, data and information ("collected data"). The AI engine may be configured to generate, train, validate, test and/or deploy one or more AI models. The interactive GUI engine may be configured to generate and dynamically update an interactive GUI. The one or more servers may comprise one or more processors, a memory and computer-readable instructions that, when executed by the one or more processors, cause the data interpolation platform to determine, display and dynamically update predictive and interpolated pricing data.

18 Claims, 9 Drawing Sheets

Related U.S. Application Data

(60) Provisional application No. 63/490,832, filed on Mar. 17, 2023.

(56) References Cited

U.S. PATENT DOCUMENTS

| | | | |
|---|---|---|---|
| 2020/0118019 A1* | 4/2020 | Sengupta | G06T 11/206 |
| 2022/0301048 A1* | 9/2022 | Hoger von Hogersthal | G06N 3/044 |
| 2023/0043702 A1* | 2/2023 | Sells | G06Q 40/03 |
| 2023/0105547 A1* | 4/2023 | Kamkar | G06Q 40/03 705/38 |
| 2023/0177428 A1* | 6/2023 | Hauser | G06F 16/24578 705/7.25 |
| 2024/0227884 A1* | 7/2024 | Bradley | B61L 15/009 |

OTHER PUBLICATIONS

Alphanome.AI, "Valuation vs. Price: Understanding the Difference and its Implications for Investors", 2023, retrieved from "https://www.alphanome.ai/post/valuation-vs-price-understanding-the-difference-and-its-implications-for-investors" (Year: 2023).*

Lloyd Bell, "The Difference between Price and Value in Business Valuation", 2024, Meaden and More, retrieved from "https://www.meadenmoore.com/blog/consulting/understanding-the-difference-between-price-and-value-in-business-valuation" (Year: 2024).*

Bin Weng et al. "Predicting Short-Term Stock Prices using Ensemble Methods and Online Data Sources", Expert Systems with Applications, 112:258-273 (Year: 2018).*

\* cited by examiner

DATA INTERPOLATION PLATFORM FOR GENERATING PREDICTIVE AND INTERPOLATED PRICING DATA

CROSS-REFERENCE TO RELATED APPLICATION

This application is a continuation of U.S. patent application Ser. No. 18/597,110 filed Mar. 6, 2024, which claims priority to U.S. Provisional Patent Application No. 63/490,832 filed Mar. 17, 2023. The entire contents of the above-identified applications are hereby fully incorporated herein by reference.

TECHNICAL FIELD

The present disclosure relates generally to intelligent data interpolation, and more particularly, to an artificial-intelligence (AI) driven platform configured for generating, displaying, updating and customizing predictive data sets, in real-time, when limited data and information is available.

BACKGROUND

Problems exist in the field of electronic data modeling, particularly as it pertains to modeling datasets having limited, outdated and/or unreliable data. In the context of data projections, for example, existing systems generally require a large corpus of historical datasets in order to generate future data projections. Absent this large corpus of data, resulting data projections are inaccurate and unreliable. Moreover, even with the existence of larger historical datasets, existing systems nonetheless remain unable to account for data volatility (e.g., data values that change rapidly), for diverse data types and/or data sources, or other factors that may impact the accuracy of data projections. This is due, in large part, to the antiquated modeling technology utilized by existing systems.

Accordingly, there is a need for a new type of system that incorporates new data modeling technology that is specifically configured for generating and updating accurate and reliable data projections, and for automatically re-calculating and adjusting the data projections with changing conditions (e.g., discovery of new or updated relevant data) as they fluctuate (e.g., in real-time or near real-time), particularly when there is limited, incomplete, outdated, conflicting and/or otherwise unreliable historical data.

There is also a need for a new type of interactive GUI that, among other things, displays dynamic data projection results and that auto-updates (in real-time or near real-time) to reflect changes to one or more of the data used to model and determine the data projections being displayed.

Further still, there is a need for the new type of system to easily be integrated with other tools and devices, so as to enable users to seamlessly integrate otherwise disparate features and functions into a single platform.

SUMMARY

Systems, methods and computer program products for generating, displaying, updating and customizing predictive data sets, in real-time, when limited data and information is available, is described herein. In some embodiments, a system according to the present disclosure may comprise a data interpolation platform that itself comprises a data collector, a pre-processor, an artificial intelligence (AI) engine, an interactive graphical user interface (GUI) engine, a data monitor and one or more servers. The data collector may be configured to collect, from among one or more data sources, data and information ("collected data"). The AI engine may be configured to generate, train, validate, test and/or deploy one or more AI models. The interactive GUI engine may be configured to generate and dynamically update an interactive GUI. The one or more servers may comprise one or more processors, a memory and computer-readable instructions that, when executed by the one or more processors, cause the data interpolation platform to perform one or more operations.

In an embodiment, the data collector may receive the collected data, and the AI engine may deploy at least one AI model from among the one or more AI models to identify and purge outlier data from among the collected data. The pre-processor may then normalize and/or weight the collected data to create pre-processed data, which may then be used to generate one or more datasets. The AI engine may deploy at least one AI pricing model from among the one or more AI models using the one or more datasets as input and generating predictive and interpolated pricing data as output. The interactive GUI engine may then generate one or more graphical price visualizations based on the predictive and interpolated pricing data, and display them via the interactive GUI.

In an embodiment, the data monitor may detect a change to the collected data and/or a presence of new data from among the one or more data sources (collectively, "detected data"), and in response, the data interpolation platform may update the one or more datasets responsive to the detected data and re-deploy the at least one AI pricing model, using the one or more updated datasets as input, to generate updated predictive and interpolated pricing data. The interactive GUI engine may then generate one or more updated graphical price visualizations based on the updated predictive and interpolated pricing data and dynamically update the interactive GUI to display the one or more updated graphical price visualizations.

BRIEF DESCRIPTION OF DRAWINGS

So that the manner in which the features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals may have been used, where possible, to designate identical elements that are common to the figures. It is contemplated that elements disclosed in one embodiment may be beneficially utilized on other embodiments without specific recitation.

DETAILED DESCRIPTION

Figure 1:
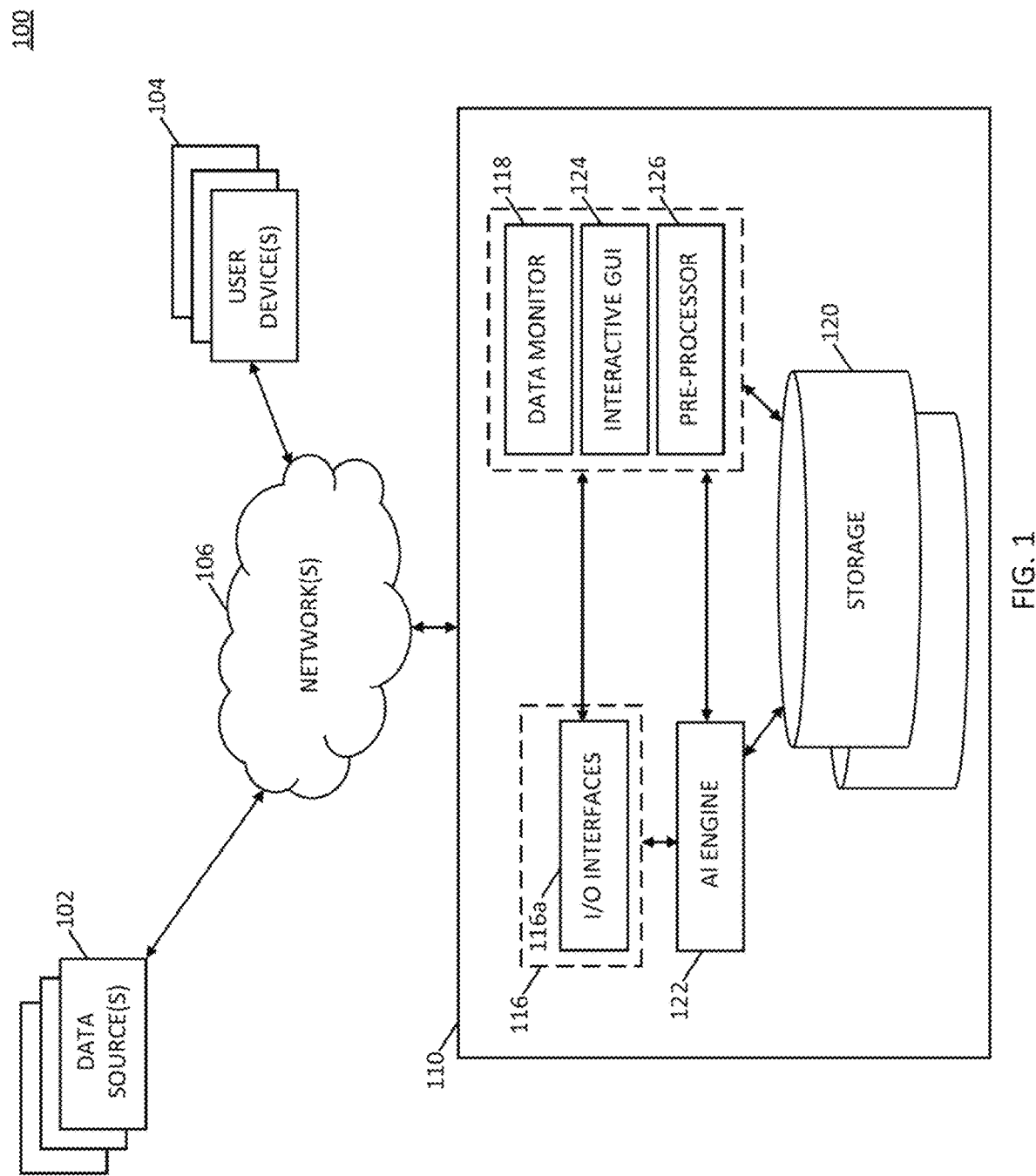
FIG. 1 is a block diagram of an exemplary system according to some exemplary embodiments described herein.

This disclosure relates generally to a system, computer program product, interactive graphical user interface (GUI) and computer-implemented method for generating, displaying, updating and customizing predictive data sets, in real-time, when limited data and information is available. For illustrative purposes, aspects of this disclosure will be described in the context of a pricing system configured to predict, display, update and customize (via an interactive GUI) pricing data and valuation visualizations relating to private markets (e.g., non-public markets involving assets that may be traded on non-public stock exchanges or stock markets). It should be understood, however, that the present disclosure is not limited thereto. To the contrary, systems, computer program products and methods described herein may be implemented in any number of industries and/or applications where generating predictive data sets is desired, and actual, reliable data is limited or missing. For example, aspects of this disclosure may be implemented for predicting traffic patterns, weather patterns, voting results, disease-treatment formulations, real estate values, performance of financial products and markets, creditworthiness and many others.

Information and data that is generally useful for pricing and/or valuations in private markets is often very limited, incomplete, outdated and/or otherwise unavailable. This is because data and information relating to private markets are, by definition, generally private (i.e., non-public). As a result, data and information pertaining to the pricing and/or valuation of private market assets are also generally private and not publically accessible. Moreover, since private markets tend to be volatile (i.e., prices and valuations are apt to change quickly and significantly) and non-transparent, any information and data that may be available is apt to lose its utility very quickly, including as quickly as microseconds, thereby rendering it unreliable. As a result, generating timely and accurate pricing and/or valuation determinations for private markets (or other markets where data is limited) continues to present extraordinary challenges.

Accordingly, the present disclosure describes new systems, computer program products and methods for quickly (e.g., in real-time or near real-time) determining and updating accurate and reliable pricing and valuation data, that automatically re-calculates and adjusts with market conditions (e.g., discovery of new or additional relevant data) as they fluctuate, particularly when there is limited, incomplete (or absent), outdated, conflicting and/or otherwise unreliable private market data.

The present disclosure also describes a new type of interactive GUI that, among other things, displays dynamic pricing and valuation results that auto-updates (in real-time or near real-time) to reflect changes to one or more of the data used to model and determine the pricing and valuation data being displayed. As will be discussed, the interactive GUI may also be customizable, to enable users to select, on the fly, which types and/or sources of data may be utilized for (and/or excluded from) determining the displayed pricing and valuation data, which combination of modeling results and data are being displayed, how the pricing and valuation is to be displayed (e.g., graphs, tables, etc.), and so on.

The systems, computer program products and methods described herein are also specifically configured for accurately and quickly modeling 'what if' pricing/valuation scenarios, particularly in implementations having limited, incomplete, outdated and/or otherwise unreliable data (e.g., in private markets). To that end, the interactive GUI of the present disclosure may be configured to receive user parameters and/or instructions, and in response, display results of the modeled 'what if' scenarios. In some embodiments, the 'what if' scenarios may be user-defined, system defined, or a combination of both. By way of example, some 'what if' scenarios that may be modeled determine their protected impact on a particular company's projected valuation may include public market activities (e.g., increases or decreases in interest rates, valuation shifts in prices of volatile stocks or sectors (e.g., cryptocurrency such as Bitcoin®), etc.), private market activities (e.g., amount of money a private company raises in round, the amount a private company raises in a down round, and the like), or a combination of both.

Additionally, users may configure, via the interactive GUI, sub-parts of one or more models to run other (user-specific) types of 'what-if' scenarios. For example, if a user assumes that pricing data of a private company co-moves with one or more other companies (i.e., fluctuates in a manner and/or extent that is similar to one or more other private and/or public companies), the user may specify the exact set of public and/or private comparable companies on which the 'what-if' scenario(s) should be modeled. In this manner, the user has an added level of control of parameters used to model the 'what-if' scenarios.

In some aspects, systems according to the present disclosure may be configured for integration with any number of other tools, devices or platforms, such as portfolio management platforms, order tracking software, lending and collateral valuation software, etc. As a result, users will be able to seamlessly incorporate system-determined interpolated prices and index data into their own user-side systems/workflows; or conversely, information and analysis generated by user-side systems and platforms may be used to automatically populate and/or update models and modeling output of the system of the present disclosure. To do this, the system described herein may further comprise any combination of application program interfaces (APIs) or any other technical means for exchanging data and information among applications and devices/components within and external to the system (discussed further below). In some examples, data and information received, uploaded, extracted or otherwise obtained from one or more external data sources may be pre-processed and converted into one or more datasets for use in training and/or deploying one or more models, as further discussed below.

Notwithstanding the foregoing, the present disclosure describes new and additional features and functionality that do not exist in existing technologies, as further discussed below.

In some embodiments, a system according to the present disclosure may include a combination of hardware and software components configured to collect and store different types of data from different data sources, and comprise one or more proprietary artificial intelligence ("AI") engines configured to generate, train, re-train, validate, test and/or deploy one or more combinations of AI algorithms, including generative AI, machine learning ("ML"), statistical modeling techniques (e.g., Bayesian statistics) or any other sub-category of AI algorithms/modeling techniques (collectively, one or more "AI models"). For purposes of this disclosure, the term "AI" broadly refers to artificial intelligence, and may include generative AI, machine learning (ML), and other subsets or types of AI. The AI models described herein may be configured (among other things) to model and analyze the collected data, interpolate/develop pricing (e.g., valuation) data (e.g., for one or more non-public companies), and create one or more dynamic pricing indices that is based on the interpolated price data and that tracks price movements of private company shares (e.g., pre-IPO (Initial Public Offering) shares) or other types of private market assets traded in a private market. Components of such a system may be physically co-located and/or disbursed across multiple locations (including in a cloud environment), and connected via a combination of one or more wired and wireless connections and networks.

The system may also include and/or be configured to generate, render, display and update (e.g., dynamically, automatically, in real-time, etc.) an interactive GUI specifically configured to dynamically display, interact with, and update (in real-time or near real-time) the interpolated price data and pricing determinations generated by the system, in a manner that reflects changes in market conditions and/or changes to any of the data used to generate the interpolated price data and pricing determinations as such changes occur. As further discussed below, certain aspects of the interactive GUI may include features that enable users to customize, on the fly, the data sources, data types and/or parameters used by the machine learning algorithm(s) to generate and/or display the interpolated prices and/or pricing determinations, the combination of modeling results and data that are being displayed, the manner in which pricing and valuation data is to displayed (e.g., graphs, tables, etc.), the type and form of analytics being determined and displayed, and so on. The interactive GUI may also comprise multiple display regions configured to simultaneously display multiple types of data and information.

A system according to the present disclosure may also be configured to accurately and quickly model 'what if' scenarios, particularly where data is limited, incomplete, outdated and/or otherwise unavailable (e.g., in private markets). The system may also include an interactive GUI that is further configured to receive user parameters and/or instructions, and in response, display results of the modeled 'what if' scenarios. In some embodiments, the 'what if' scenarios may be user-defined, system defined, or a combination of both. For example, the system may (via AI modeling) determine and suggest one or more 'what if' scenarios based on other scenarios previously utilized by a current user and/or other uses evaluating similar private companies. A user may accept the system-suggested scenario(s) as-is, or modify the scenario(s) as desired. Alternatively, or additionally, the system may, in response to a user-defined 'what if' scenario, suggest (e.g., based on machine learning modeling) modifications to the user-defined 'what if' scenario. The interactions between the user and system may continue until the user approves and/or submits one or more of the 'what if' scenarios for modeling.

In some embodiments, a system according to the present disclosure may be configured to collect multiple types of data, automatically (e.g., system determined times), continually and/or according to a pre-determined schedule, using any number of data collection means, including (without limit): direct user input (e.g., via an interactive GUI generated on a user device), uploaded and/or transmitted data files, two-way integration with user-side systems (e.g., live data feeds), file transfer protocol (FTP) servers, email, data extraction from sources such as web pages (e.g., via web scraping), database management systems (e.g., via structured query language (SQL)), web scraping, SaaS (software-as-a-service) data integration tools (e.g., via APIs or web hooks), and the like, any type of third-party data source, etc. The data, which may be collected in any number of formats, data types, file types, etc., may include (without limit): 1) completed transaction data (e.g., electronic data records representing completed transactions involving one or more private companies (and/or private company assets), 2) live indicative pricing data (e.g., live orders, indications of interest/"IOIs"), 3) public comparable data (e.g., publicly available data pertaining to one or more public companies that share similar attributes with a private company for which pricing data is being determined), and 4) accounting marks (e.g., third party estimates of fair market valuation). Additionally, the data may include sentiment data, that is, data that is indicative of sentiments and/or may be suitable for sentiment analysis (e.g., positive and/or negative) and that may be found in sources such as electronic news articles and news sources, social media platforms, market research documents, competitor analysis reports, surveys, etc.

As will be discussed below, completed transaction data may, in some scenarios, represent the most accurate and/or reliable valuation/pricing indication of a private company, particularly if the completed transaction data represents the very recent purchase and/or sale of private company stock. However, this type of data is generally very limited, unavailable, incomplete and/or outdated. As a result, the system of the present disclosure may be configured to collect other (supplemental) types of data, process and adjust (e.g., validate, clean, filter, weight, etc.) the data according to a determined reliability, combine it with the completed transaction data, and model the combination of all data to generate interpolate pricing/valuation data, indices data and other relevant modeling output. As noted above, the other types of data may include (among others) live indicative pricing data, data of comparable public companies, accounting marks, funding data, etc. The inclusion of additional data types and sources improves the accuracy and comprehensiveness of determined interpolated prices and indices. This may enhance the value and utility of the system by providing more complete and reliable data to users.

As data is collected (e.g., received, uploaded, etc.), from whatever source, one or more proprietary AI models may be deployed to analyze and identify any of the data that may appear to be suspicious, corrupt, incomplete, etc. (collectively, 'potential outlier data'). The potential outlier data may then be isolated and further analyzed, via one or more additional AI models, to determine whether the potential outlier data is acceptable (e.g., accurate and complete), in which case it may be retained for further processing; or whether the potential outlier data is suspicious, corrupt, etc., in which case such data may be removed from the remainder of the collected data and excluded from further processing. In some embodiments, the AI models may be configured to identify and further analyze potential outlier data, and generate instructions for further processing and/or discarding said potential outlier data.

Aspects of the one or more proprietary AI models may further include determining and updating one or more quality control parameters (e.g., based on trusted/validated data), and evaluating the collected data against the quality control parameters. The trusted/validated data may have been previously collected and verified by the system, used to train the AI models, and stored in a dynamic look up table or other data repository which may automatically be updated as new data is collected and verified as trustworthy/accurate. The new and verified data may then be retrieved and combined with the previously collected and verified trusted/validated data to create new training data sets and re-train the one or more AI models. In some embodiments, updates to the trusted/validated data may result in automatic updates to the quality control parameters.

Data that passes the quality control analysis and evaluation discussed above may then be further processed (or pre-processed). In some embodiments, further processing or pre-processing of the data may include 'normalizing' the data. Normalizing the data may involve (among other processes) initiating and/or deploying one or more AI models to identify and cluster data points that may have different identifiers, labels, formats, forms, structure, arrangements, etc., but nonetheless belong together according to one or more predetermined data groupings/categories. In some embodiments, normalizing may further include deploying one or more other system routines and/or components (e.g., data converter, natural language processor, etc.) to re-label, re-format, re-structure, re-arrange, and perform other operations on the data, so as to generate a uniform data set configured for processing by other aspects or components of the system. For example, transaction data pertaining to a particular company may be identified by one data source using a first identifier (e.g., CompanyX), and by a second data source using a different identifier (e.g., Co.X). One or more AI models described herein may determine (e.g., based on modeling analytics and testing) that the transaction data from these two data sources likely pertain to the same company, and as a result, should be clustered and analyzed as such. As noted above, the identifiers in this example may also be revised by the system (e.g., by interrogating a reference library) to reflect a uniform identifier format (e.g., Comp. X).

Normalized data may then be weighted (e.g., a weighting factor may be applied to each data point), where the weightings may be used to reflect the reliability of the various types/sources of data points. For example, as noted above, completed transaction data determined to provide accurate and reliable indications of a private company's valuation may be assigned higher weightings than other types of data. In scenarios where the completed transaction data may be limited, unavailable, incomplete, unreliable, outdated, etc., other types of data may be procured, utilized and combined with the completed transaction data to generate datasets that may serve as input to one or more of the AI models described herein in order to generate (among other things) interpolated and reliable pricing and valuation data.

Notably, regardless of the type of data collected, collected data of a same type may not be equally reliable (e.g., all completed transaction data may not be equally reliable), and as a result, may be weighted based on factors indicative of their respective reliability and accuracy. In some embodiments, the system may deploy one or more AI models to determine and apply weightings to the data, and as more data is collected, modeled and tested, the AI models may continue to fine tune and adjust the weightings it applies to individual data points and/or to entire data sets. In this manner, the system may continually improve the accuracy of its pricing and valuation determinations.

Factors such as type of data (e.g., completed transaction data, order data, public comparable data, accounting marks, etc.), source of data, volume of data, and timing of data (e.g., how recent was data created and/or collected), etc. may be used as input to determine a weighting that is to be applied to each data point from each data source. As noted above, the factors and weightings may be continually analyzed and updated, via AI modeling, as new data is collected and analyzed. In some embodiments, this may include generating new training data sets that include combining newly collected data and existing training data, and re-training the AI models.

The normalized and weighted data may then be combined to generate one or more datasets that may serve as input to one or more AI pricing models. The pricing models may then be deployed to generate predictive and interpolated pricing data (e.g., predictive market valuation data of one or more private companies). In some embodiments, the AI pricing models may be configured to generate a confidence interval associated with the predictive/interpolated pricing data, and as new data is collected and analyzed, normalized, weighted, etc., the pricing data and/or confidence interval may be recalculated and updated (e.g., by re-executing the AI pricing models) to reflect the impact of the new data, including in real-time (or near real-time). As with other AI models discussed herein, the AI pricing models may similarly be trained and re-trained by generating new and updated training datasets as new data and information is generated, discovered and/or otherwise obtained.

In another aspect, a system according to the present disclosure may be configured to identify and collect relevant public market data points of comparable public companies, and use this data to generate real-time evaluated prices of private companies based on price movements in the public market. In some embodiments, identifying the relevant public market data points may include deploying one or more AI models to analyze one or more public company characteristics and determine, based on the analysis, which public companies are comparable to (and thus, indicative of a valuation of) the private companies of interest. The real-time evaluated prices may then be utilized to generate a public companies index, which may in turn be used as input to one or more AI pricing models to project an evaluated price range of one or more (comparable) private companies.

Output of the system according to the present disclosure (e.g., interpolated valuated prices, pricing index, etc., collectively "price visualizations") may be viewed, customized and otherwise interacted with via an interactive GUI. For example, users may engage the interactive GUI to determine and select which type and/or source of data is included and/or excluded from determined price visualizations. For example, a user may exclude public comparable data by clicking or otherwise selecting a corresponding toggle button, a drop-down menu, or other selectable element displayed via the interactive GUI. Also, as data is collected and analyzed, the output being displayed may be updated automatically, in real-time or near real-time. This may include, for example, determining (e.g., via data monitoring, user input, etc.) the presence of new and/or updated data, creating a new input data set that includes the new and/or updated data, and re-deploying one or more AI pricing models based on the new input data set. In this manner, the determined price valuation and visualization displayed by the interactive GUI may represent the most up-to-date information, reflective of real-time changes in the markets.

As noted above, the system described herein may include one or more proprietary AI engines (collectively, the "AI engine") configured to generate, train, re-train, validate, test and/or deploy one or more AI models. The AI engine may be operatively coupled to one or more components of the system, including system storage device(s), pre-processor(s), data monitor(s), storage devices, interactive GUI, and so on, as well as external components such as user devices, third party systems or any other type of external data source (e.g., a source of data or information that is external to the system). As a result, the AI engine may be configured to receive, directly or indirectly, data and information from any number of sources, and in turn, initiate and execute one or more of the operations described herein. In some embodiments, the AI engine may also be configured to continually refine its AI models based on, for example, business rules, user sentiment data, new and updated pricing data, user input, and so on (discussed below).

The type and quantity of AI models that may be deployed by the AI engine, as well as the techniques used to train and re-train the AI models, may dynamically be determined by the system according to any number of factors (e.g., model use case, instructions or data received from one or more other components of the system, quantity and quality of collected data, prior AI modeling results, type and source of collected data, etc.).

In some embodiments, the one or more AI models of the system may include one or more generative AI models, and the one or more generative AI models may include one or more Large language models (LLMs) incorporated therein. As will be appreciated, the one or more LLMs may be configured to process or model text-based input, while other specialized models included in the generative AI models may be deployed to process or model other types of data. Collectively, the generative AI models may be deployed to process and model various types of input data, and in response, generate content or output having various data types. This may include, for example, generating text and image based content (e.g., dynamic graphical images that are representative of predictive price valuations) for display via the interactive GUI.

In some embodiments, the AI engine may further invoke a RAG (Retrieval-Augmented Generation) process, which comprises retrieving and providing grounding data to the LLMs from one or more external data sources (e.g., independent pricing data). This grounding data may then be utilized by the LLMs to formulate more accurate, contextualized content and output. In some embodiments, the sources of such grounding data may be selected, preselected, and/or updated according to any number of parameters.

In some embodiments, the AI engine may be configured to process data and input provided in a natural language format, and initiate one or more responsive commands to initiate action by the AI engine and/or other components of the system. To do this, the AI engine may invoke natural language processing (NLP) to interpret the input, and a converter to convert the interpreted input into the one or more commands. In some embodiments, the one or more commands may include deploying one or more AI models, updating one or more datasets, updating information displayed via the interactive GUI. For example, in response to input provided via the interactive GUI in a natural language format (e.g., a user question and/or instructional command), the AI engine may leverage NLP to interpret the input and generate one or more commands to deploy one or more AI models and to display content generated by the AI models via the interactive GUI. In some embodiments, the NLP may itself comprise executing one or more LLMs discussed above, for example.

In some embodiments, the system may initiate one or more actions automatically, without receiving user input, upon the occurrence of one or more predefined events and/or the existence of one or more predefined conditions as defined by the user and/or as learned or determined by the system. Such events or conditions may include, for example, identifying or receiving new and/or updated pricing data, reaching or surpassing a predetermined threshold (e.g., receiving a predetermined number of IOI's, generating a projected pricing determination that surpasses a pre-determined value, etc.), and so on. Examples of responsive automated actions may include, for example, generating a notice for display via the interactive GUI, deploying one or more AI models to re-calculate projected pricing valuations, re-training one or more AI models, etc. To do this, the system may invoke a monitor (and/or monitoring function(s)) that monitors market activity, user activity, AI generated analytics, etc. The monitor may then feed results of the monitoring to the AI engine as input, which may in turn execute one or more AI models to determine if and when to initiate the automated actions. Notably, the AI models executed by the AI engine may be trained and re-trained using certain threshold parameters, weights, etc. in order to recognize and identify the occurrence and existence of the types of events and conditions that trigger such automated actions. In some embodiments, the user may provide as input preference data that defines (among other things) the events and conditions under which the system may automatically initiate one or more system actions. In some embodiments, the system may learn user preferences by monitoring (e.g., via the monitor) and capturing user interactions with the system. The user interactions may include (without limitation) real-time and/or historic user input (e.g., selections, requests, queries, responses to prompts, etc.), as well as sentiment data, which may comprise user input that may be indicative of the user's reaction to system-generated output, displays, projections, etc.

In addition to generative AI model(s), the AI engine may comprise, generate, train, re-train, validate, test and/or deploy other types of models, such as those configured for supervised and/or unsupervised machine learning, according to the particular use case and its requirements. For purposes of this disclosure, supervised machine learning involves training AI models using labeled datasets (e.g., input data that has been paired with desired output data), from which the AI models may learn the mapping or relationship between the inputs and outputs and make predictions or classifications when presented with new, unseen data. For example, supervised machine learning tasks may include regression (i.e., predicting continuous values), decision trees e.g., for categorizing data into classes), neural networks, and others.

Conversely, unsupervised machine learning refers to training the AI models using unlabeled datasets. As a result, unsupervised machine learning identifies patterns, structures or relationships inherent to the data, without predefined labels or any output expectations. For example, unsupervised machine learning tasks may include clustering (e.g., k-means, hierarchical, etc.) for grouping similar data, dimensionality reduction (i.e., extracting essential features), and others.

In some use cases, the AI engine may deploy a combination of supervised and unsupervised AI models. For example, as it relates to detecting anomalies in data, the AI engine may deploy one or more unsupervised machine learning models to identify the anomalies, and one or more supervised machine learning models to classify the anomalies. To illustrate, one or more unsupervised machine learning models may be deployed to identify gaps and/or outliers in completed transaction records or to identify 'opportunistic' pricing data (e.g., sell order data having irregularly high prices and/or buy order data having irregularly low prices) in collected IOI data, and then deploy one or more supervised machine learning models to classify the data as outlier and/or opportunistic data that may be excluded from further processing. Notably, the one or more unsupervised and/or supervised machine learning models may be further deployed to distinguish the opportunistic pricing data from data that is reflective of actual market information/price moves, despite being irregularly high or low. In some embodiments, users may specify policy, weight and other parameter settings across any number of parameters which could then be used by the AI engine to identify anomalies and/or irregularities, and in response, automatically refine the data accordingly, as noted above.

In order to train the AI models described herein, the AI engine may collect (e.g., directly or through other system components) historic and/or current (real-time) data and information and aggregate the same to create training data. The training data may originate from within the system (e.g., internal data) and/or from external data sources (e.g., external data). In some embodiments, the training data may also include prior (or current) output generated by one or more of the AI models themselves.

In some embodiments, the training data may be pre-processed, which may include (among other operations) removing duplicates, removing corrupted data, augmenting (e.g., adding labels, annotating, etc.), resolving missing data values, filtering, formatting/re-formatting, weighting and/or otherwise normalizing the data, as discussed above. In some embodiments, portions of the training data may be utilized as collected, without pre-processing.

Once the training data is pre-processed (if necessary) or otherwise made available, the AI engine may utilize the training data to train respective AI models. Training the AI models may include generating a training data set from among the training data. In some embodiments, this may include dividing the training data into multiple datasets, each dataset for use in training, validating and/or testing the respective AI models. For example, a first portion of the training data may be utilized to create a training data set. This training data set may then be fed into one or more of the AI models to identify patterns and relationships in the training data by solving one or more objective functions, where each objective function may comprise one or more parameters. The patterns and relationships identified during training may include, for example, market/industry tendencies, interdependencies between variables, user sentiment (e.g., to AI generated output), user preferences, and the like.

A second portion of the training data may be utilized to create a validation data set, which may then be used to measure a performance of the respective AI models according to one or more performance metrics. That is, output generated by the respective AI models during training may be measured against the validation data set for accuracy (or any other performance metric). If the measured performance is unsatisfactory, one or more parameters of the objective function(s) may be adjusted and the performance re-measured. This process may be iterative and continue until the performance is deemed satisfactory (e.g., meets or exceeds the one or more performance metrics).

Following training, a third portion of the training data may be utilized to create a test data set to test the respective AI models. This may include, for example, applying a trained model to a simulated environment and/or data set, and measuring its effectiveness in one or more scenarios in view of the training dataset.

The trained, validated and/or tested AI models may then be deployed to achieve their respective and/or collective objectives. As noted above, example objectives for the AI models may include identifying gaps and/or outliers in collected data (e.g., for quality control), clustering related data, generating pricing projections, generating and/or recommending updates to user-defined "what-if" scenarios, and so on.

Results or output of the AI models may then be presented to a user (e.g. via an interactive GUI on the user's device), together with alerts, notifications, etc. In some embodiments, the user may submit (e.g., via the user's device) input to the system that is responsive to the AI model-generated results or output. The responsive input may include, for example, natural language text, feedback, or other forms of sentiment or reactionary input. This sentiment or reactionary data may then itself be modeled (e.g., via one or more AI models) and/or utilized to create one or more new training data sets. The new training datasets may comprise a combination of current and/or historic sentiment/reactionary data, and one or more of the training data sets previously utilized to train the AI models. In some embodiments, the sentiment/reactionary data may be combined with historic training data, historic sentiment/reactionary data, and/or additional current (real-time) and/or historic data to create a new corpus of training data, which may then be utilized to create the new training data sets, new validation data sets and/or new testing data sets. The new training data sets may then be utilized to re-train and/or otherwise update the AI models, as discussed above.

In some embodiments, the system may monitor, detect and/or capture new and/or updated data and information, including modeling output generated by one or more of the AI models, and utilize the new and/or updated data and information to create new training data sets. In some embodiments, the new and/or updated data and information may be combined with training data previously used to train the AI models in order to create new training data and new training data sets. The new training data sets may then be utilized to re-train, re-validate and re-test the AI models.

In some embodiments, execution/deployment of one or more of the AI models may be automatic and absent any user input. This may include for example, responsive to output generated by one or more AI models, results of advanced analytics (e.g., pattern matching, forecasting, sentiment analysis, predictive pricing determinations, etc.), meeting or exceeding one or more pre-determined thresholds, upon detecting changes in collected data and information, upon detecting changes to one or more user-defined or system-defined rules and policies, according to a predetermined schedule, upon an occurrence of one or more predetermined events, and so on. In some embodiments, deployment of the AI models may be user-initiated, such as in response to user commands and/or input (e.g., via a user device).

As noted above, input to the AI models may include, without limit, real-time (current) and historic data and information from among the system's internal components or layers—also referred to as "internal data sources" (e.g., data repositories, output from other AI models, etc.), sources external to the system, (e.g., user devices, independent data sources, etc.), or a combination thereof.

In some embodiments, performance of deployed AI models may be evaluated over time. Then, depending on the performance evaluation, the AI engine may update and/or re-train one or more of the AI models, as discussed above.

The performance of the AI models may comprise a measure of one or more performance metrics (e.g., accuracy, sentiment, etc.).

In some embodiments, the ML modeling may include implementing a Gaussian process to model price changes of private company shares by generating a confidence interval for each private company's predictive market valuation, and as new pricing data is collected (and/or collected pricing data is updated), re-computing the confidence interval (e.g., by re-executing the one or more ML algorithms). In this manner, noisy and/or disjointed pricing signals may be properly considered.

Turning now to FIG. 1, an exemplary system 100 comprising an exemplary data interpolation platform 110 according to the present disclosure is shown (also referred to herein as "the platform"). It should be noted that the exemplary system 100 and platform 110 depicted in FIG. 1, together with the following description, are provided for illustrative purposes only and should not be construed as limiting. Various modifications, alterations, and substitutions may be made to the system 100 and/or platform 110 without departing from the scope of the present disclosure. Alternative combinations, configurations, and implementations are contemplated and considered within the broader aspects of the present disclosure.

In this exemplary embodiment, the platform 110 may be powered by and comprise one or more servers (not shown), each comprising one or more processors, microcontrollers, circuits, and/or other hardware components executing computer program logic (e.g., computer-readable instructions) stored in non-transitory memory. The one or more servers may be co-located or linked across one or more networks. The computer-readable instructions, when executed by the one or more processors, may define one or more software modules or engines, one or more routines and/or one or more algorithms (e.g., AI algorithms/models) for performing the operations and functions described herein. That is, the one or more software modules, engines, routines, and/or algorithms described herein may comprise collections of code or computer-readable instructions stored on a media (e.g., non-transitory memory) that represent a series of machine instructions (e.g., program code) to implement one or more steps, features and/or operations of the platform 110. Such machine instructions may be the actual computer code the processor(s) of the platform 110 interprets to implement the instructions or, alternatively, may be a higher level of coding of the instructions that is interpreted to obtain the actual computer code. The one or more software modules, engines, routines and/or algorithms may also include one or more hardware components. One or more aspects of an example routine or algorithm may be performed by the hardware components (e.g., circuitry) itself, rather as a result of the instructions.

As shown, the platform 110 may be communicatively coupled to one or more external data sources (e.g., systems) 102, and one or more user devices 104 via one or more communication networks 106. In some examples, the one or more external data sources 102 may include the one or more user devices. The communications network(s) 106 may include, for example, a private network (e.g., a local area network (LAN), a wide area network (WAN), intranet, etc.) and/or a public network (e.g., the Internet).

The one or more external data sources 102 may each comprise at least one computing device (e.g., a server computer, a desktop computer, a laptop computer, a smartphone, a tablet, etc.) executing computer-readable instructions to capture, receive, store and/or disseminate data and information. Such data and information may include historic and/or current (e.g., real-time) data and information (e.g., market data, transaction records, order data, public company data, governmental/agency filing data, accounting data, pricing data, etc.). Examples of external data sources 102 may include (without limit) institutional investor systems, broker-dealer systems, financial exchange systems, public record systems, business entity systems, government entity systems (e.g., federal agencies, state government agencies, etc.), credit agency systems, other user systems, and/or any suitable source of data and/or information.

The user device(s) 104 may include, without limit, any combination of mobile and/or stationary communication devices such as mobile phones, smart phones, tablets computers, laptop computers, desktop computers, server computers or any other computing device configured to capture, receive, store, render, display and/or disseminate data. The user device(s) 104 may include a non-transitory memory, one or more processors executing computer-readable instructions, a communications interface which may be used to communicate with the platform 110, a user input interface for inputting data and/or information to the user device(s) 104 and/or a user display interface for presenting data and/or information on user device(s) 104. In some examples, the user input interface and the user display interface may be configured as an interactive graphical user interface (GUI) (e.g., as shown in FIGS. 3A-3E, discussed below). The user device(s) 104 may also be configured to display an interactive GUI generated and/or rendered by the platform 110.

In some embodiments, the user device(s) 104 may include at least one software application (not shown). The software application may be representative of a web browser that provides access to a website or a stand-alone application. User device(s) 104 may invoke the software application to access one or more functionalities of platform 110. For example, the user device(s) 104 may be configured to execute the software application to access, generate and/or manage user-personalized interpolated prices, forecasts, alerts, etc. pertaining to a user's account, as generated by the platform 110. Content that is displayed on the user device 104 may be transmitted from the platform 110 to the user device(s) 104, and subsequently processed by the software application for display via a graphical user interface (GUI).

In some embodiments, the platform 110 may be configured as a cloud-based service (e.g., subscription-based software as a service). In such embodiments, the users may access features and functions of the platform 110 via a web portal (e.g., generated by a web portal engine (not shown) included in the platform 110) that provides user-personalized features, information, content, etc. The level, type and amount of access available through the web portal may be based on the user's subscription level, for example.

The platform 110 may include a data collector 116 comprising one or more input and/or output interfaces (collectively referred to herein as I/O interface(s)) 116a, a data monitor 118, storage 120, one or more AI modeling engines (collectively, an AI engine) 122, an interactive GUI engine 124, a pre-processor 126, and one or more other components (not shown). In some embodiments, the data collector 116 may also include one or more data monitoring functions, and in some embodiments, the data monitor 118 may be incorporated into and/or be a part of the data collector 116.

The platform 110 may be configured to receive, retrieve, extract and/or otherwise obtain or collect data and/or information from among the external data sources 102 and/or user devices 104 via the input/output (I/O) interface(s) 116a of the data collector 116. The platform 110 may also include one or more application program interfaces (APIs), not shown, or any other technical means for exchanging data and information among applications and devices/components within and external to the platform 110 (e.g., FTP (file transfer protocol) servers, file downloads and uploads, database access, emails, etc.). Data and information from the external data sources 102 may be obtained through one or more live data feeds, one or more file transfers (including, in some examples, one or more secure file transfers), by data being pushed to platform 110 and/or by the platform 110 pulling and/or extracting data and/or information from among the external data sources 102, and via the other various data collection means discussed herein. Data and information may also be obtained from the user devices 104 as a result of user input and/or other interactions with said user devices 104, or extracted automatically from user device memory.

In some embodiments, the platform 110 (e.g., via the pre-processor 132) may filter, parse, normalize, aggregate, weight and/or perform one or more other pre-processing functions described herein in connection with the collected data, so as to retain and process relevant data to improve the system's overall modeling accuracy and efficiency, while purging and discarding irrelevant, redundant and/or biased data and information. In some examples, the platform 110 may implement one or more security protection protocols to protect the integrity of the collected data and information.

The platform's storage 120 may comprise memory, one or more databases, one or more dedicated repositories, etc. for storing data and/or information that may later be accessed for use in connection with the various functions of the platform 110. Such storage 120 may further be configured to store user and/or data profiles associated with users, data generated by internal data sources, such as components or layers of the platform 110 (e.g., electronic user accounts associated with and/or maintained by the platform 110), data from the external data sources 102, current and/or historic user activity data, AI modeling output (e.g., predictions, interpolated price data, predictive price data, recommendations, etc.) and/or data and information of any other type from any other source. The storage 120 may also be configured to store parameters, functions and/or other information that may be useful for executing, improving and/or updating any components of the platform 110 (e.g., training the platform's AI models).

The data monitor 118 may be configured to monitor data and information collected from among the external data sources 102 and/or user devices 104 to detect changes to the data and information, or the presence of new data and information. The data monitor 118 may also be configured to monitor, capture and/or store user activity and/or interactions with the platform 110. In some examples, the data monitor 118 may detect user activity and/or other collected data (and/or changes thereto) that meet one or more predetermined criteria, which may in turn be provided to one or more other components of the platform 110, such as the AI engine 122 (discussed below), for further processing. In some examples, the data monitor 118 may be configured to continuously and/or periodically monitor any of the data and information mentioned above.

The AI engine 122 may be configured to receive data and information collected from the data monitor 118, from among the external data sources 102 and user devices 104, and directly from the platform 110 itself (e.g., storage 120). This data and information may include historical, current (real-time) and/or predictive data (e.g., output from prior run AI models), and may include data and information associated with multiple users and/or multiple entities. The AI engine 122 may then use this data and information to generate training data, which in turn may be used to train, re-train, validate, test, deploy and/or update one or more AI models, as discussed above, in order to achieve one or more objectives and/or improve the one or more AI models themselves.

Output of the AI models may be used to create, manage and/or dynamically (and automatically) update predictive pricing and valuation data, 'what-if' scenarios, graphical pricing visualizations, AI model weightings and parameters, alerts, insights, suggestions, etc. In some embodiments, the platform 110 may be configured to retrieve, from the external data sources 102, the user devices 104 and/or internal data sources, such as components of the platform 110, additional data and information in responsive to output generated by the AI models. In other embodiments, the platform 110 may be configured with additional and/or alternative functions and operations, according to the particular implementation at hand.

In some embodiments, output of one or more of the AI models may be used as input to one or more other AI models, wherein based on said input, the one or more other AI models may dynamically update quality control parameters, data weightings, predictive prices and valuations, 'what-if' scenarios, etc. In some examples, the AI models may be automatically initiated upon detection of any changes to any of the data and information (e.g., updates or changes to completed transaction data, IOIs, market conditions, etc.) that may impact prior modeling output, and the AI models may automatically be updated as a result of back-testing initiated by the platform 110. In some embodiments, detecting such changes may include comparing current data and information (e.g., collected and/or monitored in real-time) to previously collected/monitored data and information, and evaluating the comparison against one or more predetermined threshold parameters. Comparisons that meet or exceed the one or more predetermined threshold parameters may then trigger re-execution of one or more of the AI models.

In some embodiments, the AI engine 122 may be configured to deploy multiple AI models at or near a same time, to enable the multiple AI models to operate concurrently and cooperatively. For example, output from a first AI model may be utilized as input for a second AI model to generate new and/or updated output from said second AI model.

In some embodiments, the AI engine 122 may generate, train, re-train, validate, test and deploy one or more AI models to achieve various and/or interrelated objectives (e.g., generate interpolated pricing data into the future as predictive market conditions evolve). Depending on the particular objective, the AI engine 122 may utilize any among various types and combinations of AI models, as discussed above. Output generated by the AI Models may then be presented (including simultaneously) via an interactive GUI on a user device 104. As further discussed below, aspects of the interactive GUI may be interactive, insofar as a user may select, reject, update, toggle-on/off, etc., via the interactive GUI, data sources and visualizations presented via said interactive GUI.

As noted above, deployment of the one or more AI models may be automatic (e.g., in response to receiving input, upon detecting changes in data, upon detecting certain user interactions, etc.) and/or according to a predetermined schedule. In some embodiments, the platform 110 may prompt/request input, for example, by generating and displaying one or more prompts on an interactive GUI displayed on a user device 104. Input to the one or more AI models may include, for example, real-time (current) and historic data and information from among the external data sources 102, the user devices 104, the platform 110 itself (e.g., monitored interactions, from storage 120, etc.), output from among the one or more AI models, and so on. In some embodiments, AI modeling input may itself be pre-processed to remove noise (e.g., duplicates, corrupted data, etc.), resolve missing data values, filter, normalize, scale, augment (e.g., to add labels and additional data types), and the like, prior to deployment of the one or more AI models.

In some embodiments, performance of the one or more AI models, once deployed, may be evaluated over time. Then, depending on the performance evaluation, the AI engine 122 may update and/or re-train one or more of the AI models. The performance of the one or more AI models may be a measure of accuracy of predictions, user sentiment (e.g., reactive user input), a utilization rate (e.g., of predictive prices to generate orders), etc.

In some embodiments, the platform 110 may be further configured to generate and transmit user-specific communications (e.g., user-personalized alerts, predictions, insights, suggestions, etc.), via a communication engine (not shown), based on output and/or instructions from the AI engine 122. These communications may, in turn, be displayed to users via the user devices 104.

In an exemplary implementation, a platform 110 of FIG. 1 may collect (e.g., via direct data feed, uploaded data files, etc.) data and information comprising electronic completed transaction records from among the one or more external data sources 102 (e.g., institutional investor systems, broker-dealer systems, etc.) and/or from storage 120, which may provide access to previously-captured historical completed transaction records). Each completed transaction record may then be analyzed by one or more AI models according to the platform's 110 quality control procedures to ensure that each data point included in the completed transaction records represents a valid, completed transaction. As indicated above, the quality control procedures may be applied to any and all data that is collected from any and all data sources. In this exemplary implementation, the quality control procedures may involve evaluating data and information included in the completed transaction records in view of one or more quality control parameters that may be based on trusted/validated data that may have been previously collected and verified by the platform 110, and stored in a dynamic look up table and/or other data repository included in the platform's storage 120. As new data is collected and verified as trustworthy and accurate, the trusted/validated data stored in the storage 120 may automatically be updated. Data and information from the completed transaction records that is validated may be retained, while data and information that does not pass a quality control analysis may be discarded and/or further processed (e.g., augmented, labeled, etc.) by the platform 110.

The quality control procedures referenced above may also involve determining whether the completed transaction records include sufficient data to accurately and quickly generate predictive pricing valuation data for a private company. If the platform 110 determines that the completed transaction records has gaps, is incomplete, includes outdated data, or is otherwise insufficient for modeling and projecting accurate pricing valuation data, the platform 110 may initiate one or more routines to collect, retrieve or otherwise obtain additional data to supplement the completed transaction data with the other types of data.

A first type of supplemental data may include live and/or historic order data (e.g., long and short orders, bids and asks), also referred to herein as IOIs. Notably, IOIs represent proposed offers to purchase and/or sell private company shares at proposed prices. As with any data described herein, this type of data may be subject to a quality control analysis to identify and exclude any data points deemed as outliers, suspicious, corrupt, etc. This type of data may be collected according to any of the data collection means discussed herein, as well as directly input to the platform 110 via an interactive GUI, for example.

A second type of supplemental data may include accounting marks, which may comprise data representing third party views of fair market valuation. In some examples, certain types of formal accounting valuation data (e.g., 409A valuation data) may be collected from public and/or private market participants and combined with marks (e.g., mutual fund marks) sourced for a plurality of public and/or private company data sources 102. As with any type of data collected by the platform 110, this type of data may similarly be analyzed for quality control, and collected according to any of the collection means discussed herein.

In some embodiments, the supplemental data may also include funding data. Funding data may represent data and information relating to one or more venture capital funding rounds. That is, data and information relating to initial investments (e.g., funding) made into the private company. As will be appreciated, this type of data and information may also provide some indication or insight into a private company's valuation (at least at a time of funding), particularly when combined and/or modeled with the other types of data described herein.

Data that has been collected and has passed a quality control analysis may then be further processed or pre-processed (e.g., normalized, weighted, etc.), as described herein, via the pre-processor 126. The pre-processor 126 may comprise a combination of one or more components, within and/or external to the platform 110, that cooperatively work together to execute one or more of the pre-processing operations described herein. As indicted above, normalizing the data may include executing any number of pre-processing functions and operations including, for example, identifying and clustering data points, labeling, annotating, filtering, formatting, cleansing (e.g., removing noise, discarding corrupt, duplicate or incomplete data, etc.), scaling, resolving missing data values, and so on, to prepare the data for use by other components or services of the platform 110. In some embodiments, one or more of the pre-processing operations may involve initiating deployment of one or more AI models via the AI engine. In some embodiments, one or more of the pre-processing operations may occur before the collected data has been subject to the quality control analysis (e.g., in order to format and otherwise prepare the collected data for one or more quality control analysis operations).

In some embodiments, the pre-processing operations may include monitoring the collected data and/or any of the pre-processing operations (e.g., labeling, annotating, etc.) to confirm compliance with one or more business rules and metrics, to generate reports, to generate alerts or notices (e.g., for display via the interactive GUI), etc.

Following and/or as part of the pre-processing operations, the platform 110 (e.g., via the pre-processor 126) may apply weightings to the collected data. These weightings may be based on any number of factors, as discussed above. In some embodiments, the platform 110 may be configured to execute one or more routines to determine a reputation score for each external data source 102. In such embodiments, weightings may be based on a measure of each data point's distance from a calculated mean and reputation score of said data point's data source 102. Further, since weighting factors may continually be updated, each new data point may have a different impact on the platform's overall modeling results.

Once the data has been analyzed for quality control and further pre-processed (e.g., normalized, weighted, etc.), the platform 110 may organize and store the collected data as one or more data sets in storage 120 (e.g., a central repository) and/or propagate the data set(s) for use by other components (e.g., hardware and/or software) of the platform 110. Upon receiving the data sets, the other system components may then utilize the same in order to perform one or more system services, operations, functions, etc. described herein. For example, the pre-processed data sets may be utilized by the AI engine 122 as input for training, re-training and/or deploying one or more AI models in order to generate pricing data and valuations for one or more private companies, actionable output, suggestions, predictions, etc.

In some embodiments, the platform 110 (e.g., via a data monitor 118) may be configured to collect and further process output and/or results generated by the other system components (e.g., AI engine 122, interactive GUI engine 124) and, in response, initiate one or more additional operations. Examples of such additional operations may include (without limitation) transmitting (e.g., via the I/O interface(s) 116a of the data collector 116) the output and/or results to the user device(s) 104 for rendering and/or display thereon, storing the output and/or results in storage 120 (e.g., a dedicated data repository), generating and transmitting notices, alerts and other communications to the user device(s) 104, re-training one or more AI models, updating data and information displayed on the interactive GUI, etc.

In some embodiments, the platform 110 may further be configured to collect (e.g., from one or more external data sources 102), pre-process, model, and otherwise process (e.g., via the AI engine 122, the pre-processor 126, etc.) data and information associated with comparable public markets in order to generate real-time predictive prices (or valuations) that are based, at least in part, on price movements in comparable public markets. This comparable public market data and information may include, for example, pricing data, price movements, company attributes and characteristics of public companies. In some embodiments, the comparable public market data and information may be combined with one or more of the other types of data described herein (e.g., order data, accounting marks, completed transactions data, etc.) and used to generate one or more comprehensive data sets which may then be provided as input to one or more AI models to generate and/or update any of the valuation and/or pricing indications described herein. Alternatively, the comparable public market data and information may be processed and modeled independently, as further discussed below.

Processing and modeling the comparable public market data may include, for example, deploying, by the AI engine 122, one or more AI models to identify, compare and cluster one or more public companies having attributes and/or characteristics that are similar to those of the private companies for which predictive price valuations are desired. In some aspects, this may include executing a natural language processing (NLP) model that is specifically configured to identify relationships in language used to describe the attributes and/or characteristic of the public companies (e.g., the companies' business models), and then suggest groupings (e.g., clusters) for the public companies based on these identified relationships. The suggested groupings may then be validated by the platform 110 and/or via user input, and the validation may then be utilized by the AI engine 122 to generate new training data sets for re-training and improving the NLP model(s).

The AI engine 122 may further deploy one or more AI models to generate a public companies index that is based on pricing data and price movements pertaining to the clustered public companies. This public companies index may then serve as input to one or more of the AI models described herein in order to generate a predictive price range for the private companies. In some embodiments, such a public companies index may be generated by consuming data and information such as prices per share, revenues, profits, balance sheets, etc. of the clustered public companies over a predetermined period of time, and then modeling this data and information to generate a pricing profile (e.g., the pricing index) that is indicative of price movements over that period of time. In some embodiments, the data and information used to create this pricing index may be weighted, for example, according to the particular company to which it pertains. For example, pricing data from larger/more impactful public companies or public companies sharing significant attributes with the private companies may be given higher weightings than smaller public companies or public companies that are less similar to the private companies. Once generated, the pricing profile or index may then be modeled to generate predictive prices/price ranges for the private companies, as noted above.

Output from the platform 110 may include interpolated price data, predictive price valuations, pricing indices, price/valuation ranges, price movements, etc., as described above. In some embodiments, the output may further include a time series of pricing/valuation data associated with one or more private companies. For example, one or more of the AI models may be deployed to generate a time series of daily, weekly, monthly, yearly, etc. prices (or interpolated prices) starting from a particular historic point in time up to a specified current or future point in time. The historic or 'backwards looking' data included in the time series may be based on historic data (e.g., data available on or before the pricing date), whereas the interpolated data, which comprises historic, current and projected future data, may populate a time series of prices that extends both into the future as well as into the past (even beyond the date of the earliest available historic data used to create this time series). To illustrate, reference is made to FIG. 2

Figure 2:
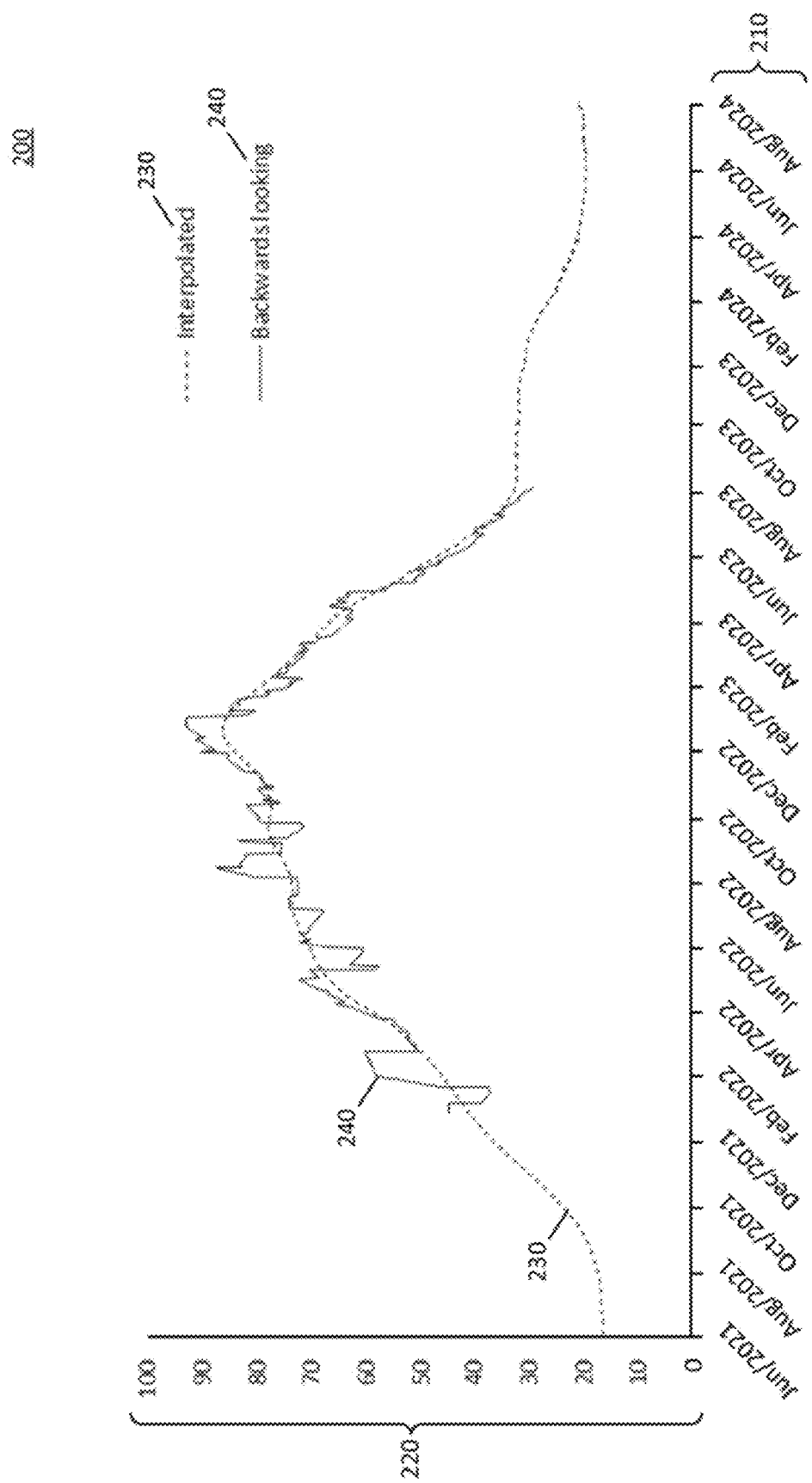
FIG. 2 is an exemplary graphical representation of a time series of pricing and valuation, for display on an interactive graphical user interface (GUI), according to some exemplary embodiments described herein.

Turning now to FIG. 2, an exemplary graphical representation 200 of a time series of pricing/valuation data is shown. The graphical representation 200 includes a horizontal axis 210 representing a monthly time series that extends from June 2021 through August 2024, and a vertical axis 220 representing pricing values between 0 and 100. In other embodiments, the time series represented by the horizontal axis 210 may comprise any measure and length of time, and the pricing values represented by the vertical axis 220 may comprise any range of values. In this example, the graphical representation 200 depicts both interpolated price data 230 and backwards looking price data 240, as determined by the platform's AI models. The interpolated price data 230 is shown extending from a particular historic point in time (i.e., June 2021) up to a specified future point in time (August 2024); whereas the backwards looking price data 240 only extends between approx. January 2022 and August 2023. This is because, as noted above, the backwards looking price data 240 includes historic data that was available on or before a pricing date. In this example, since the pricing date (i.e., the date on which the graphical representation 200 of the backwards looking pricing data 240 was generated) is August 2023, the backwards looking pricing data 240 is only depicted between these dates. As will be appreciated, generating and depicting the interpolated price data 230 is much more informative and valuable to users.

Output of the platform 110 described herein may be viewed, customized and otherwise interacted with via an interactive GUI, as noted above. In some embodiments, this output may also include daily predictive prices for any number of private companies, as well as a confidence interval associated with each daily predictive price. Similarly, the output may include weekly predictive prices, monthly predictive prices, and/or predictive prices determined according to any other time metric (and associated confidence intervals) as appropriate for the particular embodiment. In either case, the predictive prices may be based on trend analysis and other current and/or historic indicators of price movements generated by the one or more AI models, as described herein. In some examples, the daily (or weekly, monthly, etc.) predictive prices may include a price per share, an overall private company valuation, and/or other data and information.

As used herein, the term 'confidence interval' generally refers to a probability that a parameter will fall between a pair of values around a mean. In the context of the present disclosure, a confidence interval may be used to describe a probability that a transaction involving a private company on a given date (e.g., purchase for shares of the private company) will fall within a particular price range surrounding a platform-generated predictive price. For example, if the platform 110 generates a daily predictive price of $10/share on a given date, the platform 110 may also generate a confidence interval, or range of prices above and below $10/share, within which transactions involving that private company will fall into. A first range of prices defined as falling between $8/share and $12/share may represent a 90% confidence interval, while a second range of prices (e.g., between $6/share and $14/share) may define a 95% confidence interval. In this example, the 90% confidence interval may indicate that there is a 90% chance that transactions involving the private company will be priced at between $8/share and $12/share on the specific date, whereas the 95% confidence interval may indicate that there is a 95% chance that transactions involving the private company will be priced at between $6/share and $14/share on that specific date. Notably, the confidence interval may also be referred to as an expected bid-ask spread, an expected spread about a mid-point price, or in any other manner appropriate for the particular implementation.

As noted above, users may interact with and customize (e.g., via input, toggle switches, etc. displayed on the GUI) what is being displayed, how it is displayed, data included in the analysis, etc.). In addition, as any of the data changes and/or new data is collected, price data, valuations and other visualizations being determined by the platform 110 and displayed via the interactive GUI may be re-calculated and updated automatically. In this manner, users will be able to view the most up-to-date price data and valuations at all times. Moreover, the ability to customize the data sources, parameters, etc. used by the AI models to generate the predictive prices (as well as any of the other output generated by the platform 110) allows users to tailor the platform 110 to their specific needs or preferences, thereby providing greater flexibility in how the platform 110 is deployed.

Turning now to FIGS. 3A-3E, user-customizable graphical representations of predictive pricing visualizations generated by the platform 110 and displayed via an interactive GUI, according to some exemplary embodiments, are shown. As indicated above, the interactive GUI may be customizable insofar as it may be configured to enable users to select, on the fly, which types and/or sources of data and information may be utilized for (and/or excluded from) determining the displayed pricing and valuation data, which combination of modeling results and data are being displayed, how the pricing and valuation is to be displayed (e.g., graphs, tables, etc.), and so on. To accomplish this, the interactive GUI may include any number or type of selectable elements, such as toggle switches, check-boxes, drop-down menus, text boxes, data input locations, and the like. Each of these selectable elements may correspond to one or more modeling and/or display parameters, such as: type and/or source of data to model, type and/or source of data to display, type of pricing valuations to model/determine, time series of predictive pricing valuations, and any other parameter(s) for modeling, updating and/or displaying any of the various outputs generated by the platform 110.

Selections of the one or more of the selectable elements may be received by the platform 110, and in response, the platform 110 may generate new and/or updated input data sets (e.g., comprising the types and sources of data corresponding to the selections), deploy one or more AI models, routines and/or services to generate new and/or updated output based on the selections, and display new and/or updated output via the interactive GUI. In some embodiments, if the selections correspond to output that has previously been generated and is still current, the platform 110 may simply retrieve that previously-generated output and display the same via the interactive GUI. In some embodiments, if the platform 110 detects changes (e.g., via data monitor 118) to existing data and/or the presence of new data, the platform 110 may automatically deploy the one or more AI models, routines and/or services, generate new and/or updated output, and automatically update the interactive GUI to reflect the new and/or updated output.

Figure 3A:
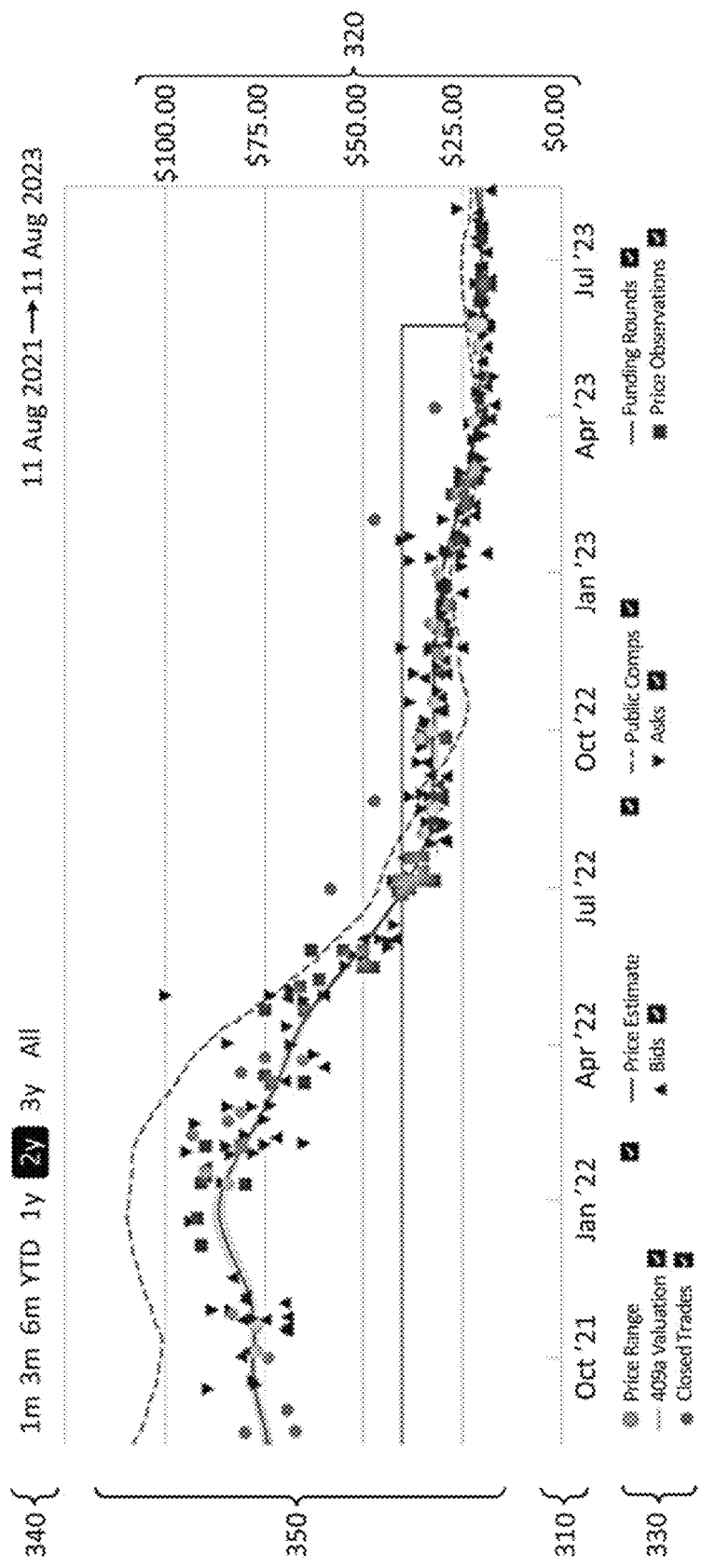
FIGS. 3A-3E are user-customizable graphical representations of predictive pricing visualizations generated by a platform and displayed via an interactive GUI, according to some exemplary embodiments described herein.

Turning now to FIG. 3A, a first exemplary graphical representation 300 of a user-customizable graphical representation of predictive pricing visualizations generated by the platform 110 and displayed via an interactive GUI is shown. In this example, the graphical representation 300 includes a horizontal axis 310 representing a time series that extends from Aug. 11, 2021 to Aug. 11, 2023, a vertical axis 320 representing pricing values (e.g., price per share) ranging from between $0 and $100+, and a display region 350 in between. In other embodiments, the time series represented by the horizontal axis 310 may comprise any measure and length of time, and the pricing values represented by the vertical axis 320 may comprise any range of values.

Also included in this exemplary graphical representation 300 are selectable elements 330, each representing a type and source of data that may be used to generate the predictive price data and/or a type of output to display via the graphical representation 300. The selectable elements 330 in this example include 409*a* valuations, closed transactions, bids, asks, public comps, funding rounds, and price observations, all of which represent a type and/or source of data, as well as price range and price estimate, which represent types of modeling results that may be determined and displayed based on the selected types of data. As shown in this FIG. 3A, all selectable elements 330 have been selected, and as a result, data points associated with each type and/or source of data, as well as determined price ranges and price estimates, are all displayed simultaneously in the display region 350. In this manner, users are able to visualize the relative value of the various data points to each other and to the platform-generated price ranges and price estimates.

This exemplary graphical representation 300 also includes a selectable time range 340, which enables users to limit what is being displayed to a particular time frame. In this example, since "2Y" has been selected, two years of data and information are being displayed.

Figure 3B:
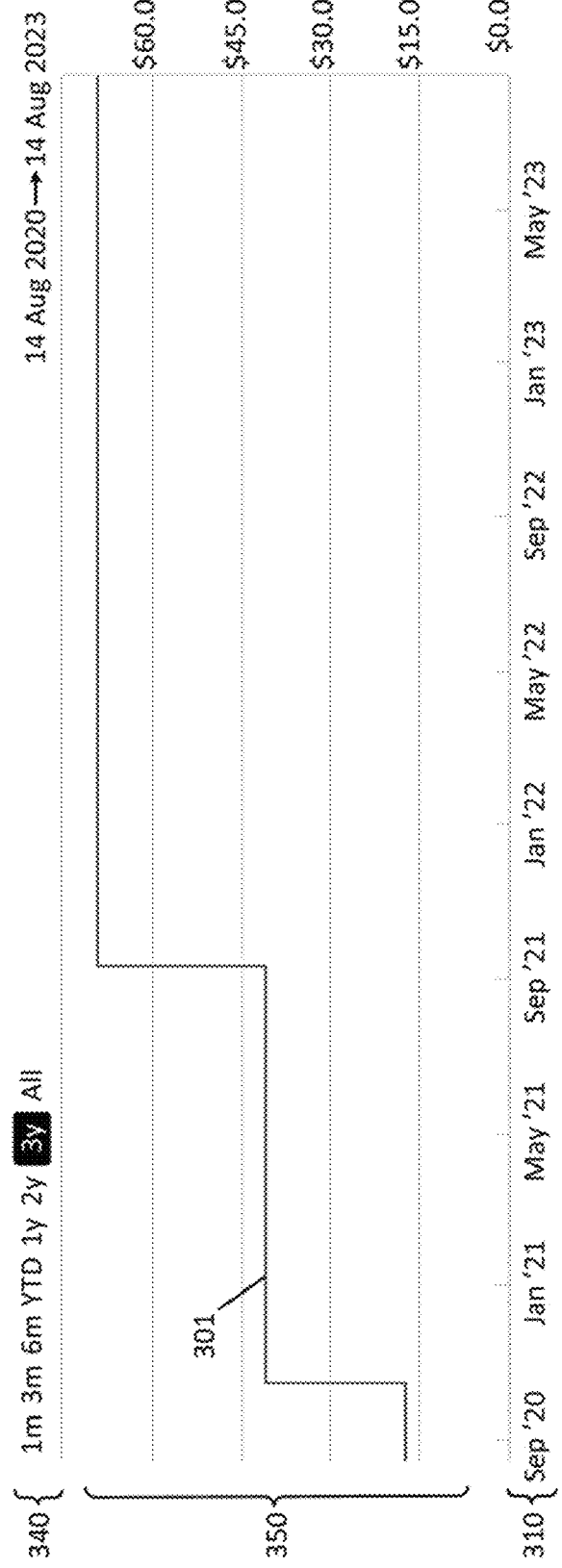

Turning now to FIG. 3B, a second exemplary graphical representation 300*a* of a user-customizable graphical representation of predictive pricing visualizations generated by the platform 110 and displayed via an interactive GUI is shown. In this example, a subset of the selectable elements 330, namely, funding rounds data 301, has been selected for display over a selectable time range 340 of "3Y" or three years (i.e., 14 Aug. 2020-14 Aug. 2023). As a result, only the funding round data 301 is depicted in the display region 350.

Figure 3C:
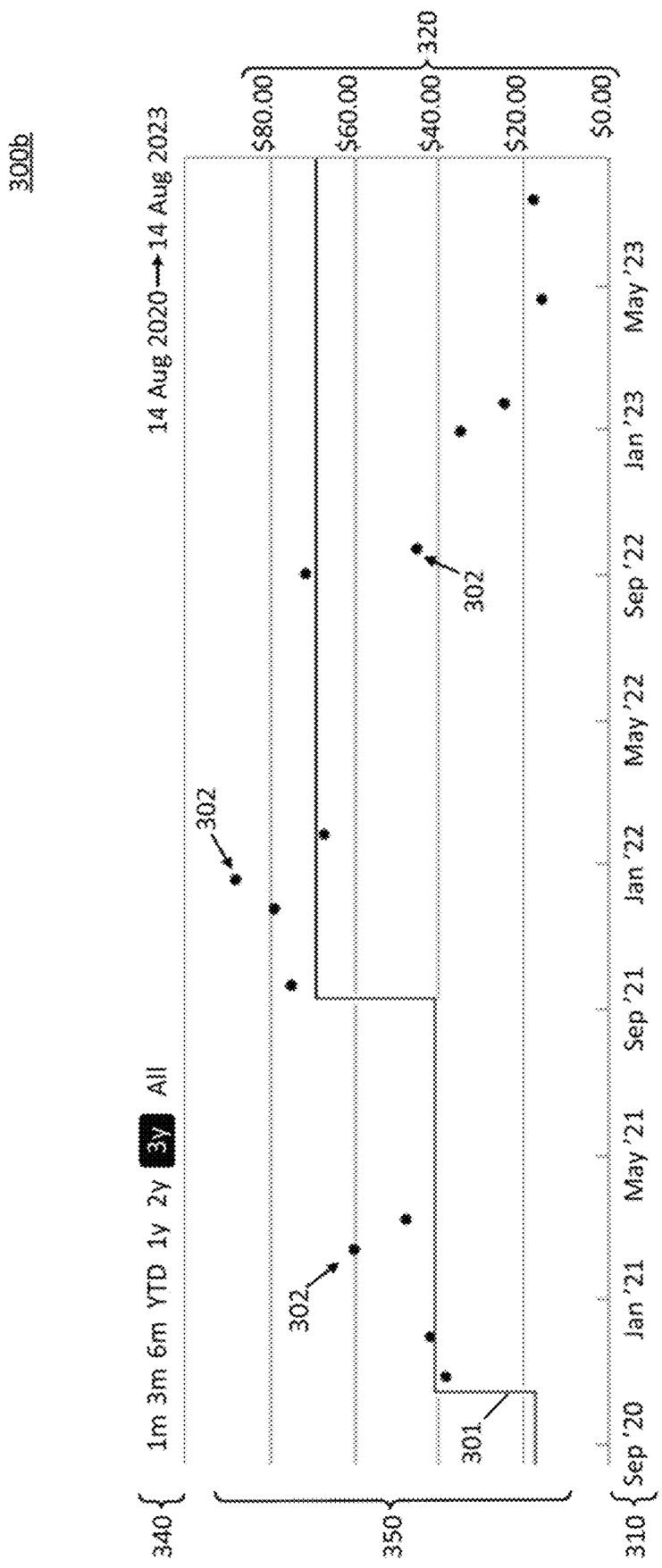

FIG. 3C shows a third exemplary graphical representation 300*b* of a user-customizable graphical representation of predictive pricing visualizations generated by the platform 110 and displayed via an interactive GUI. In this example, a different subset of the selectable elements 330, namely, funding rounds data 301 and closed transactions data 302, has been selected for display over a selectable time range 340 of "3Y" or three years (i.e., 14 Aug. 2020-14 Aug. 2023). As a result, only the funding rounds data 301 and closed transactions data 302 are depicted in the display region 350.

Figure 3D:
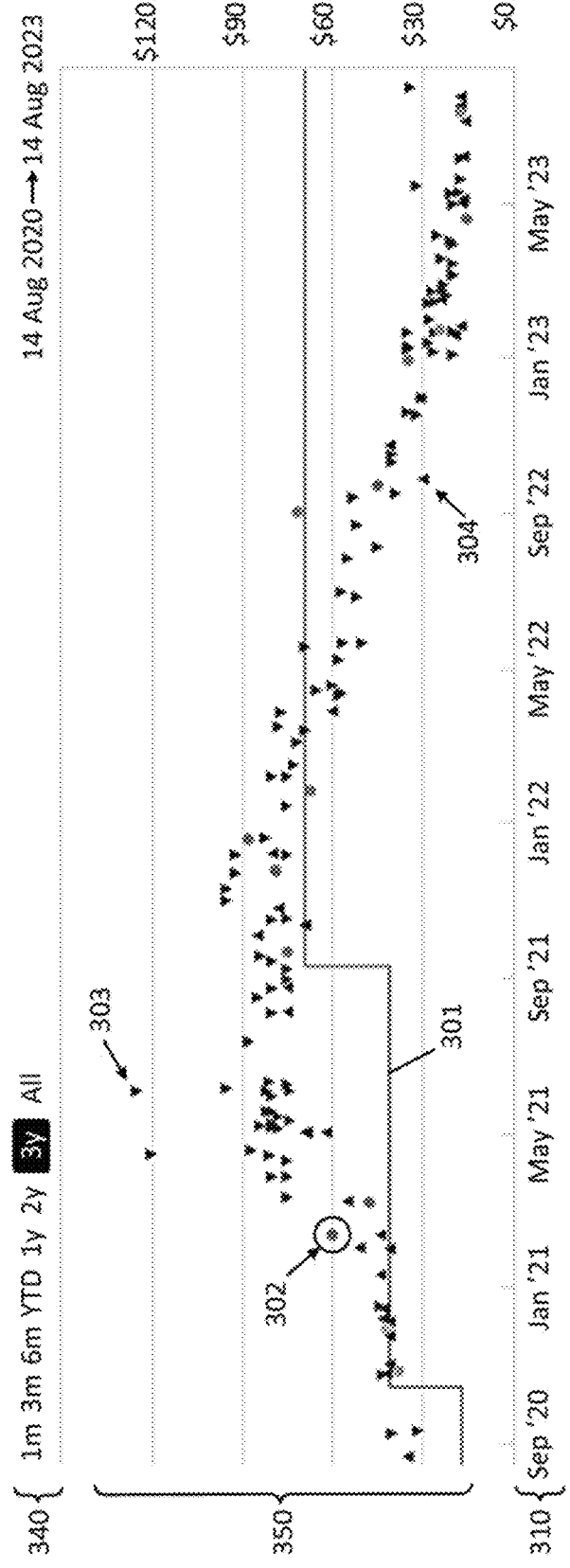

FIG. 3D shows a fourth exemplary graphical representation 300*c* of a user-customizable graphical representation of predictive pricing visualizations generated by the platform 110 and displayed via an interactive GUI. In this example, a different subset of the selectable elements 330, namely, funding rounds data 301, closed transactions data 302, and order data (e.g., bids 304 and asks 303), has been selected for display over a selectable time range 340 of "3Y" or three years (i.e., 14 Aug. 2020-14 Aug. 2023). As result, only the funding rounds data 301, closed transactions data 302, asks 303 and bids 304 are depicted in the display region 350.

Figure 3E:
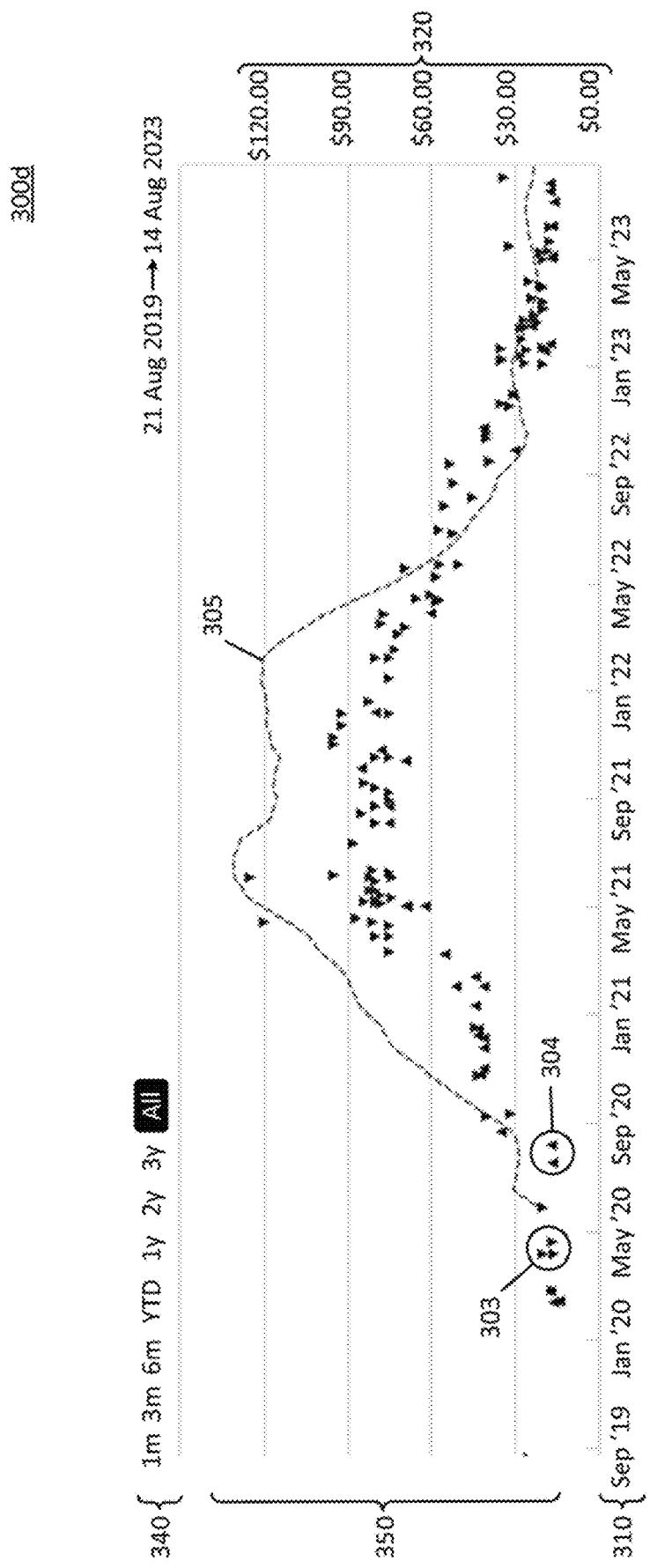

FIG. 3E shows a fifth exemplary graphical representation 300*d* of a user-customizable graphical representation of predictive pricing visualizations generated by the platform 110 and displayed via an interactive GUI. In this example, a different subset of the selectable elements 330, namely, public comps data 305 and order data 303,304, has been selected for display over a selectable time range 340 of "All" or all available (i.e., 21 Aug. 2019-14 Aug. 2023). As a result, only the public comps data 305, asks 303 and bids 304 are depicted in the display region 350.

As indicated above, the interactive GUI may include more, fewer or an alternative number and type of selectable elements, each associated with one or more modeling and/or display parameters that may be selected to generate, update and/or display user-customized predictive pricing data and information. In addition, the display itself may be customizable to include any combination and arrangement of display regions and display types. For example, the display may be customized to include a combination of tables, graphs, live data feeds (e.g., to display live market conditions), user input fields (e.g., to receive natural language input), and so on.

Figure 4:
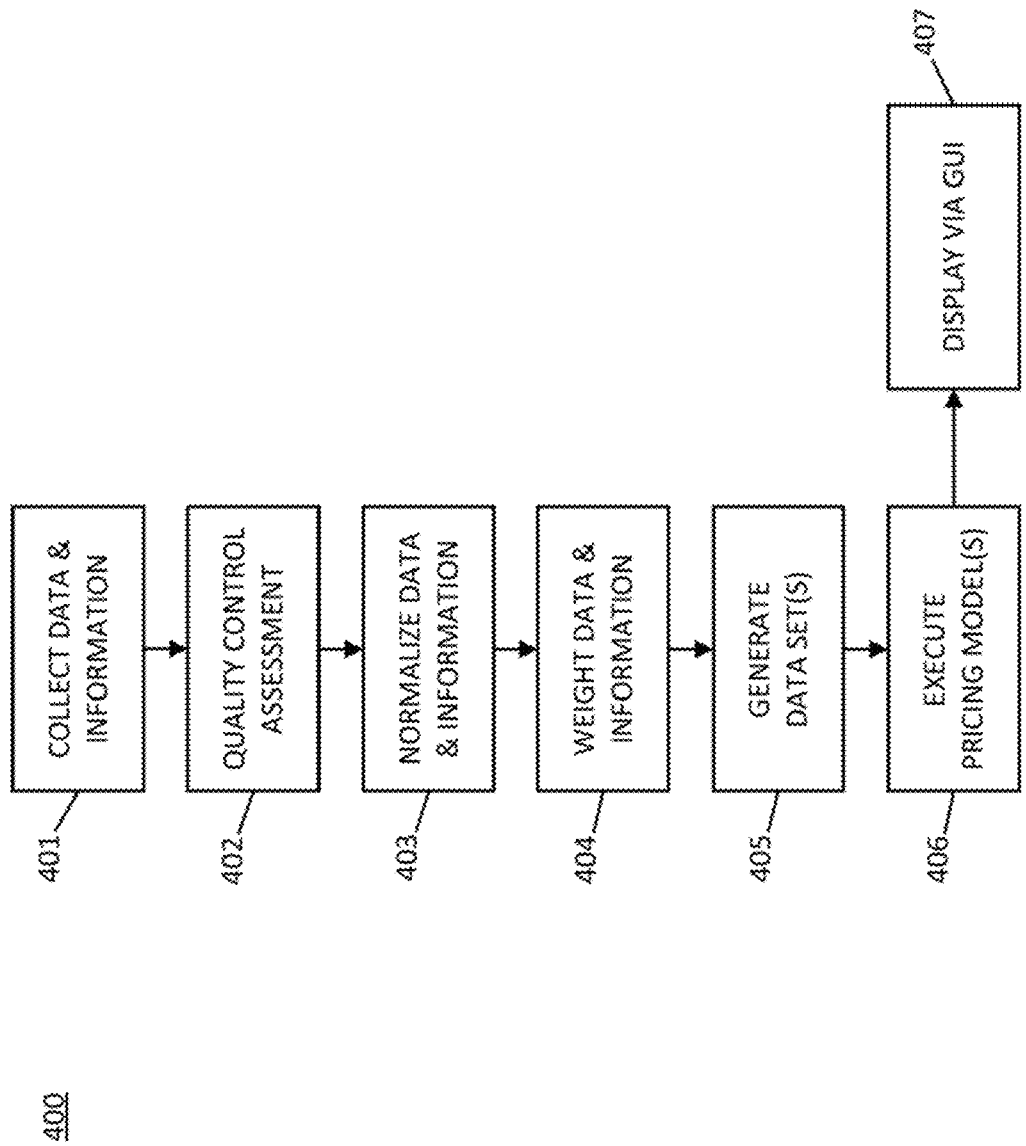
FIG. 4 is flow chart of an exemplary method according to some embodiments described herein.

Turning now to FIG. 4, flow chart of an exemplary method 400 according to some embodiments described herein is shown. At step 401, the method 400 may include collecting one or more types of data and information, continually and/or according to a pre-determined schedule. As described herein, the data and information may be collected from internal data sources, such as system components and/or from external data sources, and may include direct user input (e.g., via an interactive GUI generated on a user device), uploaded and/or transmitted data files, two-way integration with user-side systems (e.g., data feeds), third-party data sources, etc. In some embodiments, the collected data and information may include completed transaction data (e.g., electronic data records representing completed transactions involving one or more private companies (and/or private company assets), live indicative pricing data (e.g., live IOIs relating to one or more private companies), 3) public comparable data (e.g., publicly available data pertaining to one or more public companies that share similar attributes with a private company for which pricing data is being determined), accounting marks (e.g., third party estimates of fair market valuation), and other types of data suitable for generating predictive private market pricing, as described herein.

Next, at step 402, portions or all of the collected data and information may be subject to a quality control (QC) assessment, to analyze and identify any of the data and information that may be suspicious, corrupt, incomplete, etc. (collectively, 'potential outlier data'). The QC assessment may involve deploying one or more AI models to model the collected data and information in view of one or more predetermined quality control parameters. The potential outlier data may then be isolated and removed from the remainder of the collected data and information, or further analyzed. Potential outlier data that is further analyzed and deemed acceptable may be retained; whereas potential outlier data that is further analyzed and deemed to be suspicious, corrupt, or otherwise unacceptable may then be discarded. Notably, steps 401 and 402 may be iterative, meaning they may continue until a sufficient amount of quality data and information has been collected.

Data and information that passes the quality control analysis and evaluation of step 402 may then be further processed at step. In some embodiments, further processing the data and information may include normalizing the data and information (step 403). Normalizing the data and information (step 403) may involve (among other processes) deploying one or more AI models to identify and cluster data points that may have different identifiers, labels, formats, forms, structure, arrangements, etc., but nonetheless belong together according to one or more predetermined data groupings/categories. This step 403 may further include deploying one or more other system routines and/or components (e.g., data converter, natural language processor, etc.) to re-label, re-format, re-structure, re-arrange, and perform other operations on the data, so as to generate a uniform data set configured for processing by other aspects or components of the system described herein.

Next, at step 404, normalized data and information may then be weighted (e.g., a weighting factor may be applied to each data point), where the weightings may be used to reflect the reliability of the various types/sources of data points. For example, if completed transaction data is determined to provide more accurate and reliable indications of a private company's valuation than other types of data, completed transaction data may be assigned higher weightings than the other types of data. In some embodiments, determining and applying weightings to the data and information may involve deploying one or more AI models to determine and apply the weightings, and as more data and information is collected, modeled and tested, the AI models may continue to fine tune and adjust the weightings it applies to individual data points and/or to entire data sets.

At step 405, the normalized and weighted data and information may then be combined to generate one or more datasets that may serve as input to one or more AI pricing models. Then, at step 406, the pricing models may then be deployed to generate predictive and interpolated pricing data (e.g., predictive market valuation data of one or more private companies). In some embodiments, the AI pricing models may also be configured to generate a confidence interval associated with the predictive/interpolated pricing data, and as new data is collected and analyzed, normalized, weighted, etc., the pricing data and/or confidence interval may be recalculated and updated (e.g., by re-executing the AI pricing models (step 406)) to reflect the impact of the new data, including in real-time (or near real-time).

At step 407, results of the AI pricing models (e.g., predictive/interpolated price data, confidence intervals, etc.) may be displayed, customized and otherwise interacted with via an interactive GUI. As discussed above, users may engage the interactive GUI to determine and select which type and/or source of data is included and/or excluded from the interactive GUI display. Also, as data is collected and analyzed, the results of the AI pricing models being displayed may be updated automatically, in real-time or near real-time.

Figure 5:
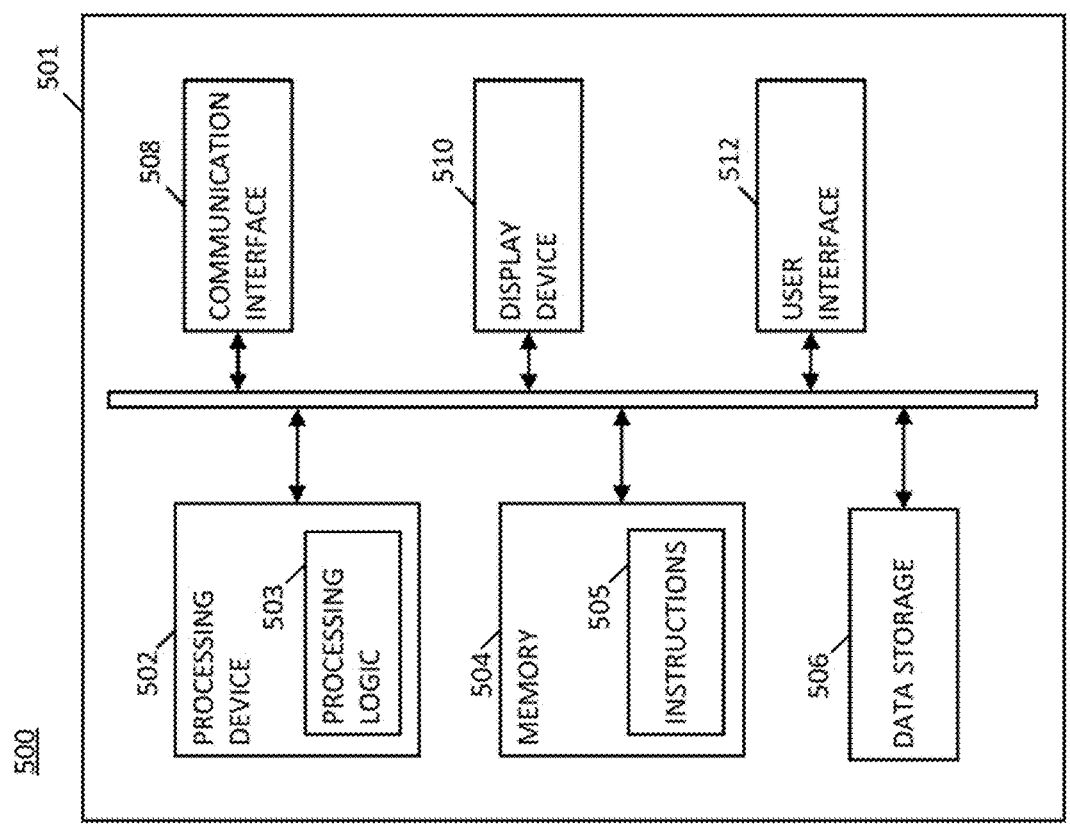
FIG. 5 is a block diagram of an exemplary machine configured for performing methodologies, processes and/or functions, according to some exemplary embodiments described herein.

Turning now to FIG. 5, a functional block diagram 500 of an exemplary machine 501 within which a set of instructions for causing the machine 501 to perform any one or more of the methodologies, processes and/or functions described herein may be executed. In some embodiments, the machine 501 may be connected (e.g., networked) to other machines as described above. The machine 501 may operate in the capacity of a server or a client machine in a client-server network environment, or as a peer machine in a peer-to-peer (or distributed) network environment. The machine 501 may be any special-purpose machine capable of executing a set of instructions (sequential or otherwise) that specify actions to be taken by that machine 501 for performing the functions describe herein. Further, while only a single machine 501 is illustrated, the term "machine" shall also be taken to include any collection of machines that individually or jointly execute a set (or multiple sets) of instructions to perform any one or more of the methodologies and/or to provide any of the features and functions described herein. In some embodiments, the platform 110 described above (and/or one or more of its components) may comprise one or more specialized machines 501, such as the example shown in FIG. 5, where each of said specialized machines 501 may be particularly programmed to perform certain methodologies, features and/or functions of the platform 110.

The example machine 501 of FIG. 5 may include a processing device 502, memory 504, a data storage device 506 and a communication interface 508, which may communicate with each other via a data and control bus. In some examples, the machine 501 may also include a display device 510 and/or a user interface 512. The processing device 502 may include a microprocessor, a central processing unit, an application-specific integrated circuit (ASIC), a field programmable gate array (FPGA), a digital signal processor (DSP) and/or a network processor, and it may be configured to execute processing logic 503 for performing the operations described herein.

Machine memory 504 may include, for example, at least one of a read-only memory (ROM), a random-access memory (RAM), a flash memory, a dynamic RAM (DRAM) and a static RAM (SRAM), storing computer-readable instructions 505 executable by the processing device 502. The memory 504 may include a non-transitory computer readable storage medium storing computer-readable instructions 505 executable by the processing device 502 for performing the operations described herein. Although one memory device 504 is illustrated in FIG. 5, in some examples, the exemplary machine 501 may include multiple memory devices 504 (e.g., dynamic memory and static memory).

The exemplary machine 501 of FIG. 5 may further include a communication interface device 508 for communicating with other computers (including wired and/or wireless communication) and/or for communication with a network. In some examples, the exemplary machine 501 may include display device 510 (e.g., a liquid crystal display (LCD), a touch sensitive display, etc.) and/or a user interface 512 (e.g., an alphanumeric input device, a cursor control device, etc.).

In some examples, the machine 501 of FIG. 5 may include a data storage 506 device storing instructions (e.g., software) for performing any one or more of the functions described herein. The data storage device 506 may include a non-transitory computer-readable storage medium, including, without being limited to, solid-state memories, optical media and magnetic media.

Systems and methods of the present disclosure may include and/or may be implemented by one or more specialized computers including specialized hardware and/or software components. For purposes of this disclosure, a specialized computer may be a programmable machine (e.g., see FIG. 5) capable of performing arithmetic and/or logical operations and specially programmed to perform the functions described herein. In some embodiments, computers may comprise processors, memories, data storage devices, and/or other components. These components may be connected physically or through network or wireless links. Computers may also comprise software which may direct the operations of the aforementioned components. Computers may be referred to as servers, personal computers (PCs), mobile devices, user devices and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. Connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

What is claimed is:

1. A computer-implemented method comprising:
in a system comprising a data interpolation platform, the data interpolation platform comprising:
a data collector configured to collect, from among one or more data sources, data and information ("collected data"),
a pre-processor,
an artificial intelligence (AI) engine configured to at least one of generate, train, validate, test and execute multiple AI models, the multiple AI models including at least one AI pricing model configured to generate predictive or interpolated pricing data;
an interactive graphical user interface (GUI) engine configured to generate and dynamically update an interactive GUI,
a data monitor, and
one or more servers comprising a memory, computer-readable instructions, and one or more processors executing the computer-readable instructions, thereby causing the data interpolation platform to perform operations, the operations comprising:
receiving, by the data collector, the collected data;
executing, by the AI engine, at least one AI model from among the multiple AI models to identify outlier data from among the collected data, wherein the outlier data is determined using predetermined quality control parameters;
removing the determined outlier data from the collected data;
grouping and weighting, by the pre-processor, the collected data to create pre-processed data;
generating, from among the pre-processed data, one or more datasets;
executing, by the AI engine, the at least one AI pricing model from among the multiple AI models, said at least one AI pricing model using the one or more datasets as input and generating the predictive or interpolated pricing data as output;
generating, by the interactive GUI engine, one or more graphical price visualizations based on the predictive or interpolated pricing data;
displaying, via the interactive GUI, the one or more graphical price visualizations;
detecting, by the data monitor, at least one of a change to the collected data and a presence of new data from among the one or more data sources (collectively, "detected data"), the new data comprising data that is different from the collected data;
updating the one or more datasets responsive to the detected data;
re-executing, by the AI engine, the at least one AI pricing model, using the one or more updated datasets as input, to generate updated predictive or interpolated pricing data;
generating one or more updated graphical price visualizations based on the updated predictive or interpolated pricing data; and
dynamically updating the interactive GUI to display the one or more updated graphical price visualizations.

2. The computer-implemented method of claim 1, wherein the one or more data sources comprise a combination of one or more external data sources and one or more internal data sources,
the one or more external data sources including one or more from among institutional investor systems, broker-dealer systems, financial exchange systems, public records systems, business entity systems, government entity systems, credit agency systems, user devices, electronic news sources, social media platforms, electronic survey sources, market research document sources, and competitor analysis report sources; and
wherein the one or more internal data sources comprise one or more hardware and software components of the data interpolation platform.

3. The computer-implemented method of claim 1, further comprising:
collecting, by the data collector, the collected data at least one of automatically, continually and according to a predetermined schedule using one or more collection means,
the one or more collection means comprising at least one of direct user input via the interactive GUI, one or more live data feed, file transfer protocol (FTP), data extraction, and web scraping.

4. The computer-implemented method of claim 3, wherein the collected data comprises a combination of completed transaction data, indications of interest ("IOI's"), public comparable data, accounting marks data and sentiment data.

5. The computer-implemented method of claim 1, further comprising:
identifying and clustering, by the pre-processor, data points from among the pre-processed data; and
performing, by the pre-processor, one or more additional pre-processing operations on the collected data, the additional pre-processing operations comprising at least one of a filtering, parsing, data conversion, augmenting, formatting, and aggregating operation.

6. The computer-implemented method of claim 5, further comprising:
instructing, by the pre-processor, the AI engine to execute at least one other AI model from among the multiple AI models as part of performing the grouping, weighting and additional pre-processing operations.

7. The computer-implemented method of claim 1, wherein the data interpolation platform is configured as a cloud-based software-as-a-service (SaaS) providing access to features and functions of the data interpolation platform via a web portal that provides user-personalized features, information, and content to users.

8. The computer-implemented method of claim 7, wherein the cloud-based SaaS comprises a subscription service, and wherein a level, type and amount of access available through the web portal is based on each user's subscription level.

9. The computer-implemented method of claim 1, further comprising:
monitoring, by the data monitor, user interactions with the data interpolation platform ("interaction data") and providing the interaction data to one or more components of the data interpolation platform for additional processing.

10. The computer-implemented method of claim 9, further comprising:
generating, by the AI engine, training data from among the collected data, the interaction data, and output generated by one or more among the multiple AI models.

11. The computer-implemented method of claim 1, further comprising:
generating, by the at least one AI pricing model, a confidence interval associated with the predictive or interpolated pricing data; and
generating and displaying, by the interactive GUI engine via the interactive GUI, a graphical price visualization representative of the confidence interval.

12. The computer-implemented method of claim 1, wherein the collected data comprises public market data and information ("public data"), and wherein the operations further comprise:
executing, by the AI engine, the at least one AI model among the multiple AI models to identify, from among the collected data, the public data that is associated with one or more public companies that are comparable to at least one private company;
determining real-time evaluated price data based on the public data;
generating a public companies' index based on the real-time evaluated price data; and
determining an evaluated price range of the at least one private company based on the public company's index.

13. The computer-implemented method of claim 1, further comprising:
determining and displaying, automatically and in real-time, an impact of the new data via the interactive GUI.

14. The computer-implemented method of claim 1, wherein the interactive GUI comprises one or more selectable elements for selecting a combination of modeling and display parameters, and wherein the operations further comprise:
receiving, via the one or more selectable elements, input defining a selected combination of modeling parameters;
generating a customized dataset based on the selected combination of the modeling parameters;
re-executing the at least one AI pricing model, using the customized dataset as input, to generate customized predictive or interpolated pricing data;
generating one or more customized graphical price visualizations based on the customized predictive or interpolated pricing data; and
dynamically updating the interactive GUI to display the one or more customized graphical price visualizations.

15. The computer-implemented method of claim 14, wherein the input comprises a selected combination of display parameters, and wherein the operations further comprise:
updating the one or more customized graphical price visualizations based on the selected combination of display parameters; and
dynamically updating the interactive GUI to display the one or more updated customized graphical price visualizations.

16. The computer-implemented method of claim 14, wherein the selectable elements comprise a combination of toggle switches, check-boxes, drop-down menus, text boxes and data input fields.

17. The computer-implemented method of claim 1, further comprising:
generating, based on the predictive or interpolated pricing data, a time series of prices that extends from a historic point in time up to a specified further point in time.

18. The computer-implemented method of claim 17, wherein the time series of prices comprises at least one of daily prices, weekly prices, monthly prices, quarterly prices and yearly prices.

* * * * *